United States Patent
Hamaguchi et al.

(10) Patent No.: US 8,704,489 B2
(45) Date of Patent: Apr. 22, 2014

(54) BATTERY SYSTEM, VEHICLE, AND BATTERY MOUNTED DEVICE

(75) Inventors: Hiroshi Hamaguchi, Toyota (JP); Satoshi Goto, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 711 days.

(21) Appl. No.: 12/532,204

(22) PCT Filed: Jan. 20, 2009

(86) PCT No.: PCT/JP2009/051143
§ 371 (c)(1),
(2), (4) Date: Sep. 21, 2009

(87) PCT Pub. No.: WO2009/093723
PCT Pub. Date: Jul. 30, 2009

(65) Prior Publication Data
US 2010/0085015 A1  Apr. 8, 2010

(30) Foreign Application Priority Data
Jan. 24, 2008  (JP) .................. 2008-014271

(51) Int. Cl.
*H02J 7/00*  (2006.01)
(52) U.S. Cl.
USPC .......................................... 320/134; 320/136
(58) Field of Classification Search
USPC ......................................................... 320/134
See application file for complete search history.

(56) References Cited

U.S. PATENT DOCUMENTS

| | | |
|---|---|---|
| 6,025,698 A | 2/2000 | Kim et al. |
| 2006/0071634 A1 | 4/2006 | Meyer et al. |
| 2006/0087291 A1 | 4/2006 | Yamauchi |
| 2006/0181244 A1 | 8/2006 | Luo et al. |
| 2006/0247871 A1* | 11/2006 | Emori et al. ................ 702/57 |
| 2008/0122399 A1* | 5/2008 | Nishino et al. ............. 320/103 |

FOREIGN PATENT DOCUMENTS

| | | |
|---|---|---|
| EP | 2 019 468 A1 | 1/2009 |
| JP | 2000-21441 | 1/2000 |
| JP | 2002-231316 | 8/2002 |
| WO | WO 2007/132929 A1 | 11/2007 |

OTHER PUBLICATIONS

Communication pursuant to Article 94(3) EPC for EP Appl. No. 09 704 915.9 dated Jun. 30, 2011.

* cited by examiner

*Primary Examiner* — Drew A Dunn
*Assistant Examiner* — Robert Grant
(74) *Attorney, Agent, or Firm* — Finnegan, Henderson, Farabow, Garrett & Dunner, LLP

(57) ABSTRACT

A battery system (SV1) comprises a lithium ion secondary battery (101), charge and discharge control means (S2, S6-S8), and internal resistance detecting means (M1). The charge and discharge control means comprises: mode control means including increasing mode control means (S2) for increasing the internal resistance of the lithium ion secondary battery and decreasing mode control means (S8) for decreasing the internal resistance; and mode selecting means (S6, S7) for selecting the decreasing mode control means (S8) or the increasing mode control means (S2) when a level of the internal resistance is estimated by the internal resistance detecting means.

21 Claims, 18 Drawing Sheets

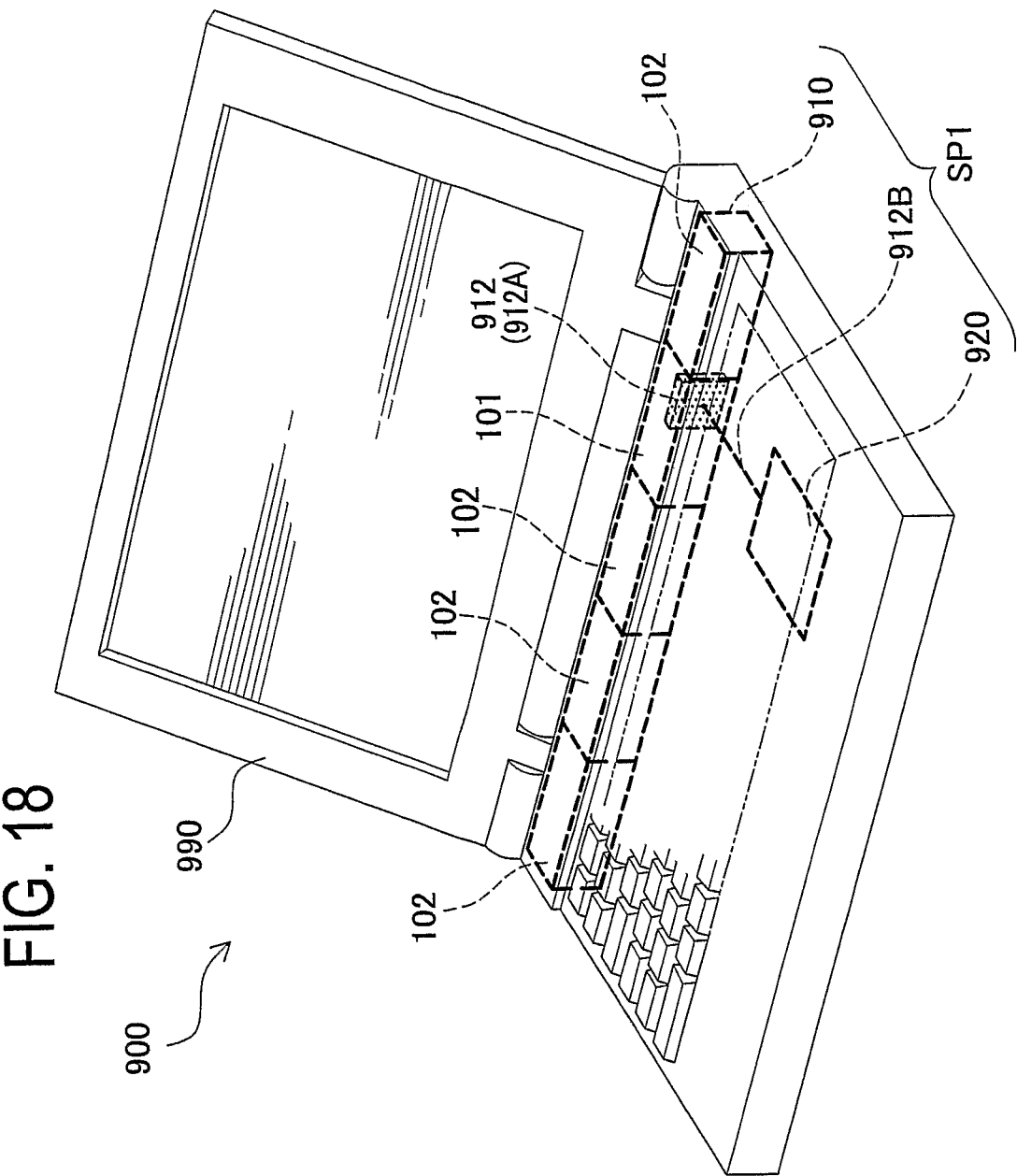

BATTERY SYSTEM, VEHICLE, AND BATTERY MOUNTED DEVICE

TECHNICAL FIELD

The present invention relates to a battery system, a vehicle on which the battery system is mounted, and a battery mounted device.

BACKGROUND ART

In recent years, lithium ion secondary batteries have been used as a power source for driving a vehicle, such as a hybrid electric vehicle or an electric vehicle, or a portable electronic device, such as a notebook computer or a video camcorder.

For example, Patent Literature 1 discloses a lithium ion secondary battery using $LiPF_6$ as a nonaqueous electrolyte, and having a concentration of lithium salt of 0.4 to 0.8 mol/L. Repeated charging and discharging of such a lithium ion secondary battery is known to lead to degradation phenomena, including a gradual increase in internal resistance of the battery.

CITATION LIST

Patent Literature

Patent Literature 1: JP2000-21441A

SUMMARY OF INVENTION

Technical Problem

However, the inventors of the present invention have found that charge and discharge conditions of a lithium ion secondary battery having an increased internal resistance are appropriately adjusted, for example, by repeating the charging and discharging such that the discharging is performed at smaller current than that during charging, whereby the internal resistance of the battery can be gradually decreased. Conversely, the charge current smaller than the discharge current has been found to gradually increase the internal resistance. Such phenomena are apt to occur during charging and discharging of the battery at a high rate (at large charge and discharge currents).

When the internal resistance of the battery increases by repetition of charging and discharging, the concentration of lithium ions in a retained electrolyte retained between a positive electrode plate and a negative electrode plate of a power generating element becomes low. That is, a negative correlation that the increase in internal resistance results in the decrease in concentration has been found to exist between the internal resistance and the concentration. Conversely, a stored electrolyte that can be interconnected with the retained electrolyte among the electrolytes and which is stored outside the power generating element in a battery case has also been found to have a positive correlation between the lithium ion concentration and the internal resistance of the battery that the increase in internal resistance results in the increase in concentration.

The invention has been made in view of the above circumstances, and it is an object of the invention to provide a battery system which controls charging and discharging of a lithium ion secondary battery to suppress an increase in internal resistance of the battery and further reduce the battery internal resistance, thereby recovering the degradation of the battery, thus restraining the internal resistance within an appropriate range, and to provide a vehicle and a battery mounted device equipped with the battery system.

Solution to Problem

To achieve the above object, the present invention provides a battery system comprising: one or more lithium ion secondary batteries each having a power generating element and an electrolyte being impregnated in the power generating element and containing lithium ions; charge and discharge control means for controlling charging and discharging of each of the lithium ion secondary batteries; and internal resistance detecting means for performing at least one of detection and estimation about a level of internal resistance in at least one of the lithium ion secondary batteries; wherein the charge and discharge control means comprises: a plurality of mode control means for controlling charging and discharging each of the lithium ion secondary batteries on a predetermined charge and discharge condition, the mode control means including: increasing mode control means for controlling charging and discharging each of the lithium ion secondary batteries on an increasing charge and discharge condition, the increasing mode control means being configured to gradually increase the internal resistance of each of the lithium ion secondary batteries by continuously performing charge and discharge control; and decreasing mode control means for controlling charging and discharging each of the lithium ion secondary batteries on a decreasing charge and discharge condition different from the increasing charge and discharge condition, the decreasing mode control means being configured to gradually decrease the internal resistance of each of the lithium ion secondary batteries by continuously performing charge and discharge control; mode selecting means for selecting one mode control means to be used from the plurality of mode control means, wherein the mode selecting means is configured: to select the decreasing control means when the internal resistance detecting means detects or estimates that the internal resistance is relatively high; and to select the increasing control means when the internal resistance detecting means detects or estimates that the internal resistance is relatively low.

The battery system of the invention includes the internal resistance detecting means, the increasing mode control means, the decreasing mode control means, and the mode selecting means. Thus, for example, when the charging and discharging of each of the lithium ion secondary batteries (hereinafter also simply referred to as "battery(s)") is controlled by the increasing mode control means and then the internal resistance of each of the batteries gradually increases and becomes relatively high, the charge and discharge control is switched from the increasing mode control means to the decreasing mode control means. As a result, the internal resistance of each of the batteries can be decreased to restore the degradation of the battery. Conversely, when the charging and discharging is controlled by the decreasing mode control means and then the internal resistance of each of the batteries gradually decreases and becomes relatively low, the charge and discharge control is switched to the increasing mode control means, which can prevent the internal resistance from excessively decreasing or can prevent the internal resistance from rather increasing due to continuous control by the decreasing mode control means for decreasing the internal resistance. In this way, the internal resistance of each of the batteries can be constantly restrained within the appropriate range.

A method for detecting or estimating the level of the internal resistance using the internal resistance detecting means involves, for example, determining a value of the internal resistance detected or estimated (or a value of physical quantity to be described later) by comparison with a threshold. A predefined value can be used as the threshold. Alternatively, an appropriate value measured or computed after the start of use of each of the batteries can also be used as the threshold.

On the other hand, a method for detecting or estimating a value of the internal resistance involves, for example, detecting the internal resistance by measurement of DC resistance or impedance of the battery(s) to be detected. Other methods may include a method for estimating the internal resistance value by measuring a physical quantity having a correlation with the internal resistance, for example, by measuring a lithium ion concentration of an electrolyte (a retained electrolyte or a stored electrolyte) in the battery(s) to be detected, and a method for estimating the internal resistance by computation from a battery used state (the number of charging and discharging, the magnitude of charge current or discharge current, the ambient temperature, or the like).

The internal resistance of each of the batteries gradually changes by repeated charging and discharging. For example, in order to discharge the same electrical quantity, the following cases are supposed: a case in which the discharge current is continuously controlled to be relatively large, and a case in which the discharge current is continuously controlled to be relatively small. In the latter case, the increase in internal resistance of each of the batteries can be suppressed, or rather decreased as compared to the former case.

In contrast, in order to charge the same electrical quantity, the following cases are supposed: a case in which the charge current is continuously controlled to be relatively large, and a case in which the charge current is continuously controlled to be relatively small. In the former case, the increase in internal resistance of each of the batteries can be suppressed, or rather decreased as compared to the latter case.

As can be seen from consideration of, for example, a hybrid electric vehicle, in actual use of each of the batteries, the battery is hardly driven according to a constant charge and discharge pattern, but driven according to a combination of various charge and discharge patterns. However, when observing the internal resistance for a long time to some degree (for example, for three or more months), a condition for gradually increasing the internal resistance and a condition for gradually decreasing the internal resistance exist depending on setting conditions of charging and discharging.

That is, the decreasing charge and discharge condition is a charge and discharge condition in which the internal resistance of each of the batteries is gradually decreased by repeatedly charging and discharging each of the batteries by the decreasing mode control means corresponding to the condition. Thus, the charge and discharge conditions for gradually decreasing the internal resistance of each of the batteries include, for example, a discharge condition for making the discharge current relatively small during discharging or a charge condition for making the charge current relatively large during charging.

The increasing charge and discharge condition is a charge and discharge condition in which the internal resistance of each of the batteries is gradually increased by repeatedly charging and discharging each of the batteries by the increasing mode control means corresponding to the condition. Thus, the charge and discharge conditions for gradually increasing the internal resistance of each of the batteries include, for example, a discharge condition for making the discharge current relatively large during discharging or a charge condition for making the charge current relatively small during charging.

Furthermore, according to another aspect, the present invention provides a battery system comprising: one or more lithium ion secondary batteries each having a power generating element and an electrolyte being impregnated in the power generating element and containing lithium ions; charge and discharge control means for controlling charging and discharging of each of the lithium ion secondary batteries; and internal resistance detecting means for performing at least one of detection and estimation about a level of internal resistance in at least one of the lithium ion secondary batteries; wherein the charge and discharge control means comprises: a plurality of mode control means for controlling charging and discharging each of the lithium ion secondary batteries on a predetermined charge and discharge condition, the mode control means including: first mode control means for controlling charging and discharging each of the lithium ion secondary batteries on a first charge and discharge condition; and second mode control means for controlling charging and discharging each of the lithium ion secondary batteries on a second charge and discharge condition different from the first charge and discharge condition; mode selecting means for selecting one mode control means to be used from the plurality of mode control means, wherein when a comparison is made between a case of discharging each of the lithium ion secondary batteries by the first mode control means and a case of discharging each of the lithium ion secondary batteries by the second mode control means, a discharge current by the second mode control means is made smaller on a predetermined discharge condition and equal to or smaller on other discharge conditions than a discharge current by the first mode control means, and the mode selecting means is configured: to select the second mode control means when the internal resistance detecting means detects or estimates that the internal resistance is relatively high; and to select the first mode control means when the internal resistance detecting means detects or estimates that the internal resistance is relatively low.

The battery system of the invention includes the lithium ion secondary battery, the charge and discharge control means, and the internal resistance detecting means. The charge and discharge control means includes the plurality of mode control means including the first mode control means and the second mode control means, and the mode selecting means. In the battery system of the invention, when the internal resistance of the battery(s) to be detected is detected or estimated to be relatively high, the charging and discharging by the second mode control means according to the second charge and discharge condition is selected. When each of the batteries is charged or discharged by the second mode control means, the discharge current flowing on the predetermined discharge condition of the second charge and discharge condition is made relatively small as compared to the case of the first mode control means according to the first charge and discharge condition. Even on other discharge conditions, the discharge current is made equal or smaller. Thus, the repeated charging and discharging of each of the batteries using the second mode control means can decrease the internal resistance to restore the degradation of each of the batteries.

Conversely, when the internal resistance of the battery(s) to be detected is detected or estimated to be relatively low, the first mode control means is selected. When the charging and discharging is performed by the first mode control means, the discharge current on the predetermined discharge condition is made relatively large as compared to the case of the second mode control means. Even on other discharge conditions, the discharge current is made equal or larger. Thus, the charging and discharging is repeatedly performed by selecting the first mode control means, which can prevent the internal resistance from excessively decreasing or can prevent the internal resistance from rather increasing due to continuous control by the second mode control means for decreasing the internal resistance.

Accordingly, appropriate means can be selected in use from the first mode control means and the second mode control means to constantly restrain the internal resistance of each of the batteries within the appropriate range.

The first mode control means and the second mode control means preferably have the same charge condition.

The first charge and discharge condition is preferably a charge and discharge condition in which the internal resistance of each of the batteries is gradually increased by repeatedly charging and discharging each of the batteries by the first mode control means corresponding to the condition.

Further, the second charge and discharge condition is preferably a charge and discharge condition in which the internal resistance of each of the batteries is gradually decreased by repeatedly charging and discharging each of the batteries by the second mode control means corresponding to the condition.

In the above battery system, preferably, the predetermined discharge condition is a discharge condition where a maximum discharge current available by the first mode control means flows.

In the battery system of the invention, when each of the batteries is discharged by the second mode control means on the predetermined discharge condition, that is, on the discharge condition where the maximum discharge current available by the first mode control means flows, the discharge current smaller than the maximum discharge current is allowed to flow through the system. That is, in the battery system of the invention, even on the discharge condition for allowing the maximum discharge current to flow through the system during discharging by the first mode control means, the second mode control means allows the discharge current smaller than the maximum current to flow through the system. Thus, when the charge and discharge control of each of the batteries is performed by the second mode control means, the magnitude of the discharge current is suppressed. The repeated charging and discharging using such second mode control means can suppress an increase in internal resistance of each of the batteries, and further gradually decrease the internal resistance, thereby restoring the degradation of each of the batteries. Conversely, the repeated charging and discharging using the first mode control means can increase the internal resistance of each of the batteries. That is, this arrangement can easily achieve the two mode control means whose changing tendencies of the internal resistance are reverse to each other.

In the above battery system, preferably, on any one of the predetermined discharge condition and said other discharge conditions, a discharge current by the second mode control means is made smaller than a discharge current by the first mode control means.

In the battery system of the invention, the discharge current by the second mode control means is smaller than that by the first mode control means on any one of the discharge conditions. The repeated charging and discharging using such second mode control means can surely suppress the increase in internal resistance of each of the batteries, and further gradually decrease the internal resistance, thereby restoring the degradation of each of the batteries. Conversely, the repeated charging and discharging using the first mode control means can gradually increase the internal resistance of each of the batteries. That is, this arrangement can easily achieve the two mode control means whose changing tendencies of the internal resistance are reverse to each other.

According to another aspect, the present invention provides a battery system comprising: one or more lithium ion secondary batteries each having a power generating element and an electrolyte being impregnated in the power generating element and containing lithium ions; charge and discharge control means for controlling charging and discharging of each of the lithium ion secondary batteries; and internal resistance detecting means for performing at least one of detection and estimation about a level of internal resistance in at least one of the lithium ion secondary batteries; wherein the charge and discharge control means comprises: a plurality of mode control means for controlling charging and discharging each of the lithium ion secondary batteries on a predetermined charge and discharge condition, the mode control means including: third mode control means for controlling charging and discharging each of the lithium ion secondary batteries on a third charge and discharge condition; and fourth mode control means for controlling charging and discharging each of the lithium ion secondary batteries on a fourth charge and discharge condition different from the third charge and discharge condition; mode selecting means for selecting one mode control means to be used from the plurality of mode control means, wherein when a comparison is made between a case of charging each of the lithium ion secondary batteries by the third mode control means and a case of charging each of the lithium ion secondary batteries by the fourth mode control means, a charge current by the third mode control means is made smaller in a predetermined charge condition and equal to or smaller in other charge conditions than a charge current by the fourth mode control means, and the mode selecting means is configured: to select the fourth mode control means when the internal resistance detecting means detects or estimates that the internal resistance is relatively high; and to select the third mode control means when the internal resistance detecting means detects or estimates that the internal resistance is relatively low.

The battery system of the invention includes the lithium ion secondary battery, the charge and discharge control means, and the internal resistance detecting means. The charge and discharge control means includes the plurality of mode control means including the third mode control means and the fourth mode control means, and the mode selecting means. In the battery system of the invention, when the internal resistance of the battery(s) to be detected is detected or estimated to be relatively high, the charging and discharging by the fourth mode control means according to the fourth charge and discharge condition is selected. In charging and discharging by the fourth mode control means, the charge current flowing on the predetermined charge condition is made relatively large as compared to the case of the third mode control means according to the third charge and discharge condition. Even on other discharge conditions, the charge current is made equal or larger. Thus, the repeated charging and discharging of each of the batteries using the fourth mode control means can decrease the internal resistance to restore the degradation of each of the batteries.

Conversely, when the internal resistance of the battery(s) to be detected is detected or estimated to be relatively low, the third mode control means is selected. When the charging and discharging is performed by the third mode control means, the charge current on the predetermined charge condition is made relatively small as compared to the case of the fourth mode control means. Even on other charge conditions, the charge current is made equal or smaller. Thus, the charging and discharging is repeatedly performed by selecting the third mode control means, which can prevent the internal resistance from excessively decreasing or can prevent the internal resistance from rather increasing due to continuous control by the fourth mode control means for decreasing the internal resistance.

Accordingly, appropriate means can be selected in use from the third mode control means and the fourth mode control means to constantly restrain the internal resistance of each of the batteries within the appropriate range.

The third mode control means and the fourth mode control means preferably have the same discharge condition.

The third charge and discharge condition is preferably a charge and discharge condition in which the internal resistance of each of the batteries is gradually increased by repeatedly charging and discharging each of the batteries by the third mode control means corresponding to the condition.

Further, the fourth charge and discharge condition is preferably a charge and discharge condition in which the internal resistance of each of the batteries is gradually decreased by repeatedly charging and discharging each of the batteries by the fourth mode control means corresponding to the condition.

In the above battery system, preferably, the predetermined charge condition is a charge condition where a maximum charge current available by the fourth mode control means flows.

In the battery system of the invention, when each of the batteries is charged by the third mode control means on the predetermined charge condition, that is, on the charge condition where the maximum charge current available by the fourth mode control means flows, the charge current smaller than the maximum charge current is allowed to flow through the system. That is, in the battery system of the invention, even on the charge condition for allowing the maximum charge current to flow through the system during charging by the fourth mode control means, the third mode control means allows the charge current smaller than the maximum current to flow through the system. Thus, when the charge and discharge control of each of the batteries is performed by the third mode control means, the magnitude of the charge current is suppressed. The repeated charging and discharging using such third mode control means can suppress a decrease in internal resistance of each of the batteries, and further gradually increase the internal resistance. Conversely, the repeated charging and discharging using the fourth mode control means can suppress an increase in internal resistance of each of the batteries, and further gradually decrease the internal resistance, thereby restoring the degradation of each of the batteries. That is, this arrangement can easily achieve the two mode control means whose changing tendencies of the internal resistance are reverse to each other.

Alternatively, in the above battery system, preferably, on any one of the predetermined charge condition and said other charge conditions, a charge current by the third mode control means is made smaller than a charge current by the fourth mode control means.

In the battery system of the invention, the charge current by the third mode control means is smaller than that by the fourth mode control means on any one of the charge conditions. The repeated charging and discharging using such third mode control means can further gradually increase the internal resistance of each of the batteries. Conversely, the repeated charging and discharging using the fourth mode control means can reliably suppress an increase in internal resistance of each of the batteries, and further gradually decrease the internal resistance, thereby restoring the degradation of each of the batteries. That is, this arrangement can easily achieve the two mode control means whose changing tendencies of the internal resistance are reverse to each other.

In one of the above battery systems, preferably, the internal resistance detecting means is resistance correlation physical quantity detecting means for estimating a level of the internal resistance based on a resistance correlation physical quantity having a correlation with the internal resistance.

In order to directly measure the internal resistance of the lithium ion battery, a measurement device is separately prepared, which makes the measurement difficult and complicated. In contrast, the internal resistance can be measured relatively easily by estimating the internal resistance based on an appropriate physical quantity having the correlation with the internal resistance (the resistance correlation physical quantity).

In the above battery system, preferably, the power generating element includes a positive electrode plate and a negative electrode plate, the electrolyte includes a retained electrolyte retained between the positive electrode plate and the negative electrode plate, and the resistance correlation physical quantity detecting means is a retained electrolyte concentration detecting means for estimating the level of the internal resistance by performing at least one of detection and estimation on a level of a lithium ion concentration of the retained electrolyte having a correlation with the internal resistance.

As mentioned above, in the lithium ion secondary battery having the internal resistance increased due to the repeated charging and discharging of each of the batteries, the lithium ion concentration of the retained electrolyte retained between the positive electrode plate and the negative electrode plate of the power generating element is gradually decreased as compared to an initial stage. Thus, the lithium ion concentration of the retained electrolyte has a negative correlation with the internal resistance of each of the batteries.

The battery system of the invention includes the retained electrolyte concentration detecting means serving as the resistance correlation physical quantity detecting means using the lithium ion concentration of the retained electrolyte as the resistance correlation physical quantity. Thus, the lithium ion concentration of the retained electrolyte is detected or estimated, which can appropriately estimate the level of the internal resistance of the battery(s) to be detected.

The retained electrolyte concentration detecting means is, for example, an analyzer that can directly measure a lithium ion concentration by extracting the retained electrolyte from the power generating element of the battery(s) to be detected. Another concentration detecting means involves providing two electrodes apart from each other and in contact with the retained electrolyte, and measuring a resistance between these electrodes thereby to measure the lithium ion concentration. Alternatively, a concentration cell is constructed using a retained electrolyte, and a reference electrolyte held separately from the retained electrolyte and having a reference lithium ion concentration, thereby measuring an electromotive force. Further, the lithium ion concentration of the retained electrolyte is estimated by calculation based on a battery used state (the number of charging and discharging, the magnitude of charge current or discharge current, the ambient temperature, or the like). Moreover, the use of the stored electrolyte concentration detecting means to be described later can also detect or estimate the lithium ion concentration of the stored electrolyte, thereby estimating a lithium ion concentration of the retained electrolyte.

In the above battery system, preferably, the power generating element includes a positive electrode plate and a negative electrode plate, each of the lithium ion secondary batteries has a battery case holding the power generating element, the electrolyte includes: a retained electrolyte retained between the positive electrode plate and the negative electrolyte plate; and a stored electrolyte stored between the power generating element and the battery case so as to allow interconnection with the retained electrolyte, the resistance correlation physical quantity detecting means is a stored electrolyte concentration detecting means for estimating the level of the internal resistance by performing at least one of detection and estimation of a level of the lithium ion concentration of the stored electrolyte having a correlation with the internal resistance.

As mentioned above, in the lithium ion secondary battery containing the retained electrolyte as well the stored electrolyte in the battery case, the lithium ion concentration of the stored electrolyte increases with increasing internal resistance of the battery by the repeated charging and discharging of the battery. This corresponds to the fact that the lithium ion concentration of the retained electrolyte decreases with increasing internal resistance of each of the batteries as mentioned above. That is, the lithium ion concentration of the stored electrolyte has the negative correlation with the lithium ion concentration of the retained electrolyte, and the positive correlation with the internal resistance.

The battery system of the invention includes the stored electrolyte concentration detecting means serving as the resistance correlation physical quantity detecting means using the lithium ion concentration of the stored electrolyte as the resistance correlation physical quantity. Thus, the lithium ion concentration of the stored electrolyte is detected or estimated, which can estimate the level of the internal resistance of the battery(s) to be detected.

The stored electrolyte concentration detecting means is, for example, an analyzer that can directly measure a lithium ion concentration by extracting the stored electrolyte from the battery(s) to be detected. Another concentration detecting means involves providing two electrodes apart from each other and in contact with the stored electrolyte, and measuring a resistance between these electrodes thereby to measure the lithium ion concentration. Alternatively, a concentration cell is constructed using a stored electrolyte, and a reference electrolyte held separately from the stored electrolyte and having a reference lithium ion concentration, thereby measuring an electromotive force. Further, the lithium ion concentration of the stored electrolyte is also estimated by calculation based on a battery used state (the number of charging and discharging, the magnitude of charge current or discharge current, the ambient temperature, or the like).

Furthermore, according to another aspect, the present invention provides a battery system comprising: one or more lithium ion secondary batteries each having a power generating element including a positive electrode plate and a negative electrode plate, an electrolyte containing lithium ions and being impregnated in the power generating element, and a battery case holding the power generating element and the electrolyte; and charge and discharge control means for controlling charging and discharging of each of the lithium ion secondary batteries, the electrolyte including: a retained electrolyte retained between the positive electrode plate and the negative electrode plate; and a stored electrolyte stored between the power generating element and the battery case so as to allow interconnection with the retained electrolyte, and stored electrolyte concentration detecting means for performing at least one of detection and estimation on a level of the lithium ion concentration in the stored electrolyte of the electrolyte in at least one of the lithium ion secondary batteries, wherein the charge and discharge control means comprises: a plurality of mode control means for controlling charging and discharging each of the lithium ion secondary batteries on a predetermined charge and discharge condition, the mode control means including: fifth mode control means for controlling charging and discharging each of the lithium ion secondary batteries on a fifth charge and discharge condition; sixth mode control means for controlling charging and discharging each of the lithium ion secondary batteries on a sixth charge and discharge condition different from the fifth charge and discharge condition; and seventh mode control means for controlling charging and discharging each of the lithium ion secondary batteries on a seventh charge and discharge condition different from the fifth and sixth charge and discharge conditions; and mode selecting means for selecting one mode control means to be used from the plurality of mode control means, wherein when a comparison is made between a case of charging and discharging each of the lithium ion secondary batteries by the fifth mode control means, a case of charging and discharging each of the lithium ion secondary batteries by the sixth mode control means, and a case of charging and discharging each of the lithium ion secondary batteries by the seventh mode control means, a discharge current by the sixth mode control means is made smaller on a predetermined discharge condition and also equal to or smaller on other discharge conditions than a discharge current by the fifth mode control means, a charge current by the seventh mode control means is made smaller on a predetermined charge condition and also equal to or smaller on other charge conditions than a charge current by the fifth mode control means, the mode selecting means is configured: to select the sixth mode control means when the stored electrolyte concentration detecting means detects or estimates that the lithium ion concentration of the stored electrolyte is higher than a concentration threshold value for the sixth mode; and to select the seventh mode control means when the stored electrolyte concentration detecting means detects or estimates that the lithium ion concentration of the stored electrolyte is lower than the concentration threshold value for the seventh mode lower than the concentration threshold value for the sixth mode.

The battery system of the invention includes the lithium ion secondary battery, the charge and discharge control means, and the stored electrolyte concentration detecting means. The charge and discharge control means includes the plurality of mode control means including the fifth mode control means, the sixth mode control means, and the seventh mode control means, and the mode selecting means.

The battery system of the invention makes the discharge current flowing on the predetermined discharge condition small during charging and discharging by the sixth mode control means as compared to that of the fifth mode control means. Even on other discharge conditions, the discharge current is made equal or smaller. In contrast, the charge current flowing on the predetermined charge condition is made small during charging and discharging by the seventh mode control means as compared to the charging and discharging by the fifth mode control means. Even on other charge conditions, the charge current is made equal or smaller.

When the lithium ion concentration of the stored electrolyte is detected or estimated to gradually increase by the charging and discharging of each of the batteries, and then to become higher than a concentration threshold for the sixth mode, the charging and discharging is performed by switching to the charge and discharge control by the sixth mode control means. Thus, the internal resistance of each of the batteries can be decreased to restore the degradation of each of the batteries.

Conversely, when the lithium ion concentration of the stored electrolyte is detected or estimated to gradually decrease and then to become lower than the concentration threshold for the seventh mode, the charging and discharging is performed by switching to the charge and discharge control by the seventh mode control means. This can prevent the internal resistance of each of the batteries from excessively decreasing or can prevent the internal resistance from rather increasing due to continuous control by the sixth mode control means and others for decreasing the internal resistance.

In this way, the internal resistance of each of the batteries can be constantly restrained within an appropriate range.

The fifth mode control means and the seventh mode control means preferably have the same discharge condition. Furthermore, the fifth mode control means and the sixth mode control means preferably have the same charge condition.

The sixth charge and discharge condition is preferably a charge and discharge condition in which the lithium ion concentration of the stored electrolyte is gradually decreased by repeatedly charging and discharging each of the batteries by the sixth mode control means corresponding to the condition.

The seventh charge and discharge condition is preferably a charge and discharge condition in which the lithium ion concentration of the stored electrolyte is gradually increased by repeatedly charging and discharging each of the batteries by the seventh mode control means corresponding to the condition.

In the above battery system, preferably, the predetermined discharge condition is a discharge condition where a maximum discharge current available by the fifth mode control means flows.

In the battery system of the invention, when each of the batteries is discharged by the sixth mode control means on the predetermined discharge condition, that is, on the discharge condition where the maximum discharge current available by the fifth mode control means flows, the discharge current smaller than the maximum discharge current is allowed to flow through the system. That is, in the battery system of the invention, even on the discharge condition for allowing the maximum discharge current to flow through the system during discharging by the fifth mode control means, the sixth mode control means allows the discharge current smaller than the maximum current to flow through the system. Thus, when the charge and discharge control of each of the batteries is performed by the sixth mode control means, the magnitude of the discharge current is suppressed. The repeated charging and discharging using such sixth mode control means can suppress an increase in internal resistance of each of the batteries, and further gradually decrease the internal resistance, thereby restoring the degradation of each of the batteries.

In one of the above battery systems, preferably, the predetermined charge condition is a charge condition where a maximum charge current available by the fifth mode control means flows.

In the battery system of the invention, when each of the batteries is charged by the seventh mode control means on the predetermined charge condition, that is, on the charge condition where the maximum charge current available by the fifth mode control means flows, the charge current smaller than the maximum charge current is allowed to flow through the system. That is, in the battery system of the invention, even on the charge condition for allowing the maximum charge current to flow through the system during charging by the fifth mode control means, the seventh mode control means allows the charge current smaller than the maximum current to flow through the system. Thus, when the charge and discharge control of each of the batteries is performed by the seventh mode control means, the magnitude of the charge current is suppressed. The repeated charging and discharging using such seventh mode control means can gradually increase the internal resistance.

Alternatively, in the above battery system, preferably, on any one of the predetermined discharge condition and said other discharge conditions, a discharge current by the sixth mode control means is made smaller than by the fifth mode control means.

In the battery system of the invention, the discharge current by the sixth mode control means is smaller than that by the fifth mode control means on any one of the discharge conditions. The repeated charging and discharging using such sixth mode control means can surely suppress the increase in internal resistance of each of the batteries, and further gradually decrease the internal resistance, thereby restoring the degradation of each of the batteries.

In one of the above battery systems, preferably, on any one of the predetermined charge condition and said other charge conditions, a charge current by the seventh mode control means is made smaller than by the fifth mode control means.

In the battery system of the invention, the charge current by the seventh mode control means is smaller than that by the fifth mode control means on any one of the charge conditions. The repeated charging and discharging using such seventh mode control means can gradually increase the internal resistance reliably.

In one of the above battery systems, preferably, the stored electrolyte concentration detecting means comprises: a first measuring electrode including: a first electrode main part immersed in the stored electrolyte; and a first conducting part exposed outside the battery case and electrically connected to the first electrode main part; a reference electrolyte having a reference lithium ion concentration; a reference electrolyte case part accommodating the reference electrolyte; a second measuring electrode including: a second electrode main part immersed in the reference electrolyte; and a second conducting part exposed outside the reference electrolyte case part and electrically connected to the second electrode main part; and a partition member having a first surface contacting the stored electrolyte and a second surface contacting the reference electrolyte for separating the stored electrolyte and the reference electrolyte from each other, the partition member being configured to prevent ion movement between the first surface and the second surface resulting from a concentration difference between the stored electrolyte and the reference electrolyte, and to enable measurement of a potential between the reference electrolyte and the stored electrolyte by the first and second measuring electrodes.

The battery system of the invention includes, as the stored electrolyte concentration detecting means, the first measurement electrode immersed in the stored electrolyte and the second measurement electrode immersed in the reference electrolyte. Thus, the lithium ion concentration of the stored electrolyte can be appropriately determined from the magnitude of an electromotive force between the first and second measurement electrodes, and the known lithium ion concentration of the reference electrolyte.

The partition member is a member which prevents the movement of ions due to the difference in concentration between the stored electrolyte and the reference electrolyte in a gap between the first and second surfaces of the partition member, and which can measure a potential between the stored electrolyte and the reference electrolyte by the first and second measurement electrodes. Specifically, the partition member is made of, for example, porous glass (Vycor glass), ceramics, such as a porous plate, or resin, each of which has such properties.

According to another aspect, moreover, the present invention provides a vehicle in which one of the aforementioned battery systems is mounted.

The vehicle of the present invention mounts the aforementioned battery system. Accordingly, based on the internal resistance or the lithium ion concentration of the retained electrolyte or the stored electrolyte, which is detected or estimated by the internal resistance detecting means, the retained electrolyte concentration detecting means, or the stored electrolyte concentration detecting means, one of the increasing mode control means (the first mode control means, the third mode control means, or the seventh mode control means) and the decreasing mode control means (the second mode control means, the fourth mode control means, or the sixth mode control means) can be selected. Consequently, it is possible to reliably suppress an increase in internal resistance of the mounted battery or reliably decrease and restore the internal resistance, thereby controlling the internal resistance within an appropriate range.

According to another aspect, moreover, the present invention provides a battery mounted device in which one of the aforementioned battery systems is mounted.

The battery mounted device of the present invention mounts the above battery system. Accordingly, based on the internal resistance or the lithium ion concentration of the retained electrolyte or the stored electrolyte, which is detected or estimated by the internal resistance detecting means, the retained electrolyte concentration detecting means, or the stored electrolyte concentration detecting means, one of the increasing mode control means (the first mode control means, the third mode control means, or the seventh mode control means) and the decreasing mode control means (the second mode control means, the fourth mode control means, or the sixth mode control means) can be selected. Consequently, it is possible to reliably suppress an increase in internal resistance of the mounted battery or reliably decrease and restore the internal resistance, thereby controlling the internal resistance within an appropriate range.

BRIEF DESCRIPTION OF DRAWINGS

FIG. 18 is an explanatory view of a notebook computer in the second embodiment.

DESCRIPTION OF EMBODIMENTS

First Embodiment

Now, a first embodiment of the invention will be described below with reference to the accompanying drawings.

Figure 1:
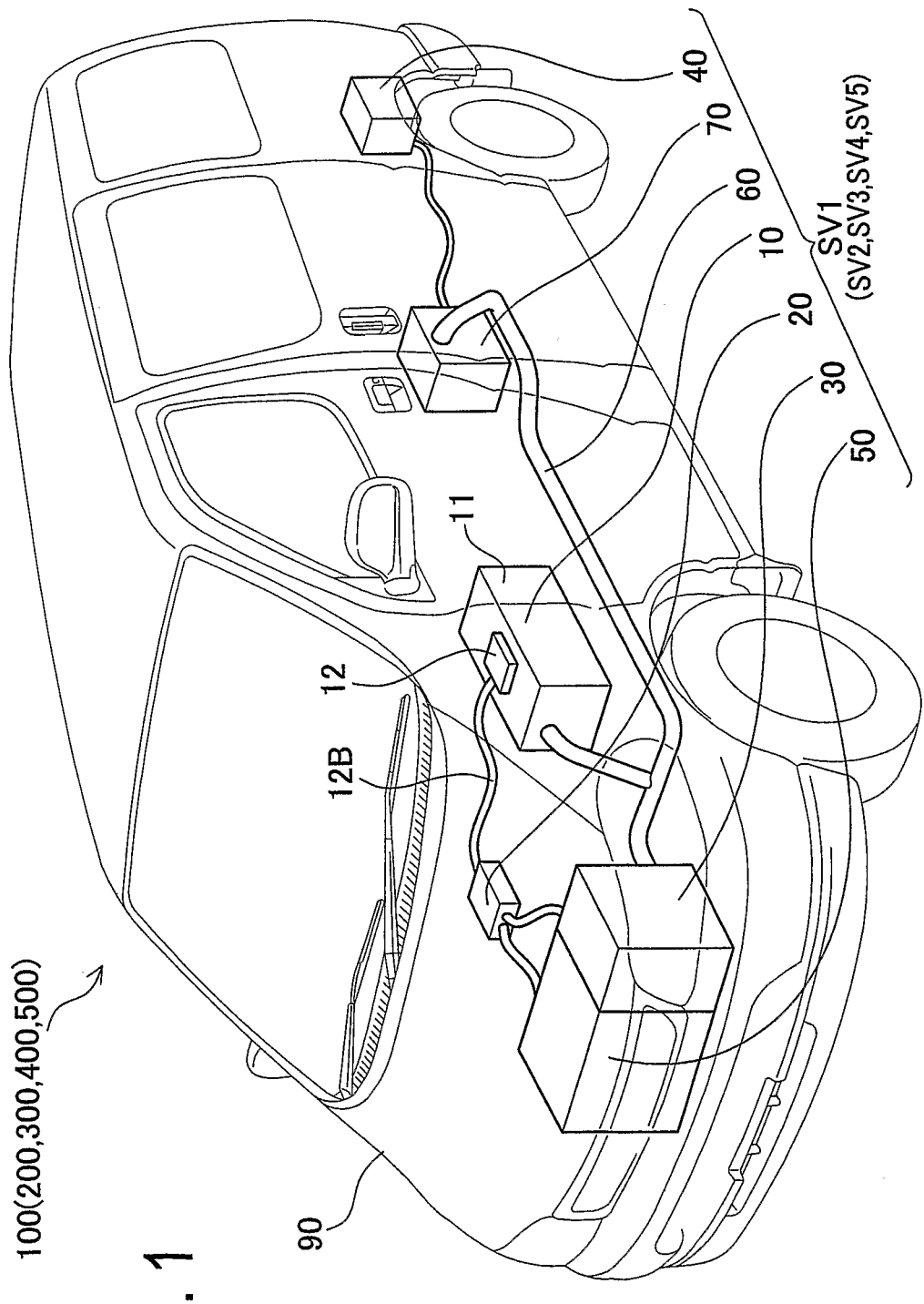
FIG. 1 is a perspective view of a vehicle of a first embodiment and first to fourth modified embodiments.

First, a vehicle 100 according to the first embodiment will be described below. FIG. 1 is a perspective view of the vehicle 100.

The vehicle 100 of the first embodiment is a hybrid electric vehicle driven by an HV controller 20 using an engine 50, a front motor 30, and a rear motor 40. The vehicle 100 includes a vehicle body 90, the engine 5, the front motor 30 attached thereto, the rear motor 40, a cable 60, an inverter 70, and a battery pack 10.

The HV controller 20 includes a microcomputer not shown, having a CPU, a ROM, and a RAM and being to be operated according to a predetermined program. The HV controller 20 enables communication with the front motor 30, the rear motor 40, the engine 50, the inverter 70, and a battery monitoring device 12 connected thereto via a communication cable 12B as will be described later, respectively. Thus, the HV controller 20 performs various types of control according to conditions of these components. For example, the HV controller controls the combination of a driving force of the engine 50 and a driving force of the motors 30 and 40 so as to make a fuel efficiency best according to a driving condition of the vehicle 100. Together with the control, the HV controller 20 controls charging and discharging the battery pack 10.

Figure 2:
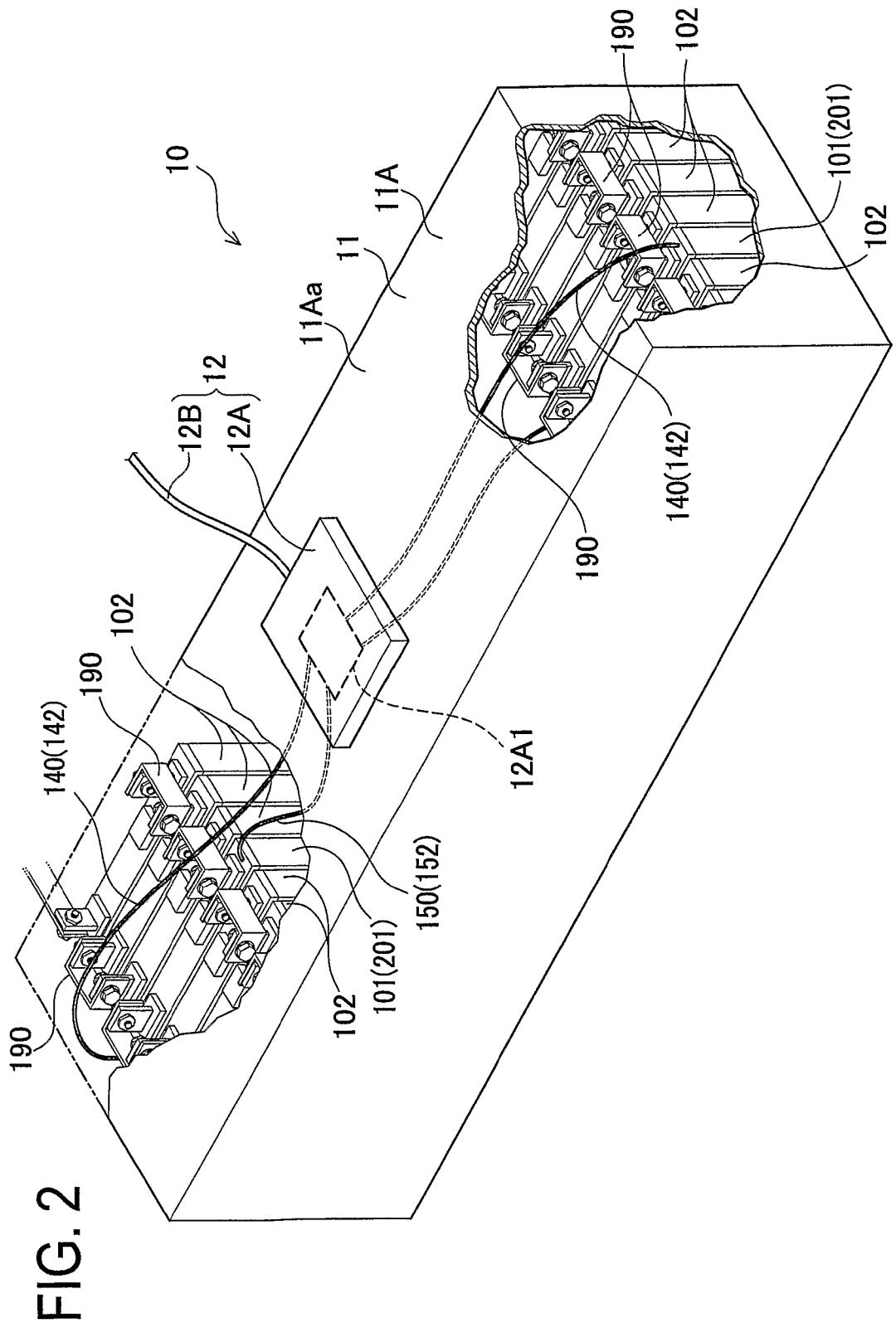
FIG. 2 is an explanatory view of a battery pack mounted on the vehicle of the first embodiment and first to fourth modified embodiments.

The battery pack 10 as shown in FIG. 2 includes a battery part 11 having a plurality of lithium ion secondary batteries (hereinafter singly referred to as a "battery") 101 and 102 in an battery pack case 11A, and the battery monitoring device 12. The battery monitoring device 12 obtains data regarding the states (temperature and voltage of the battery) of the batteries 101 and 102 of the battery part 11 by using a thermistor or a sensing line.

The battery part 11 includes two kinds of batteries 101 and 102 in a rectangular box-shaped battery case 110. A wound-type lithium ion secondary battery 101 has not only the power generating element 120 and the electrolyte 130, but also concentration difference electromotive force measurement means M1 to be described later. A lithium ion secondary battery 102 differs from the battery 101 only in that the battery 102 does not include the concentration difference electromotive force measurement means M1. The batteries 101 and 102 are connected in series by bolt fastening with a bus bar 190.

The battery 101 including the concentration difference electromotive force measurement means M1 will be described below with reference to FIGS. 3 to 5.

The battery case 110 of the battery 101 includes a case body 111 made of stainless steel, and a closing lid 112 (see FIG. 3) The case body 111 has a bottom-closed, rectangular box-like shape and has an entire internal surface attached with an insulating film made of resin (not shown).

Figure 3:
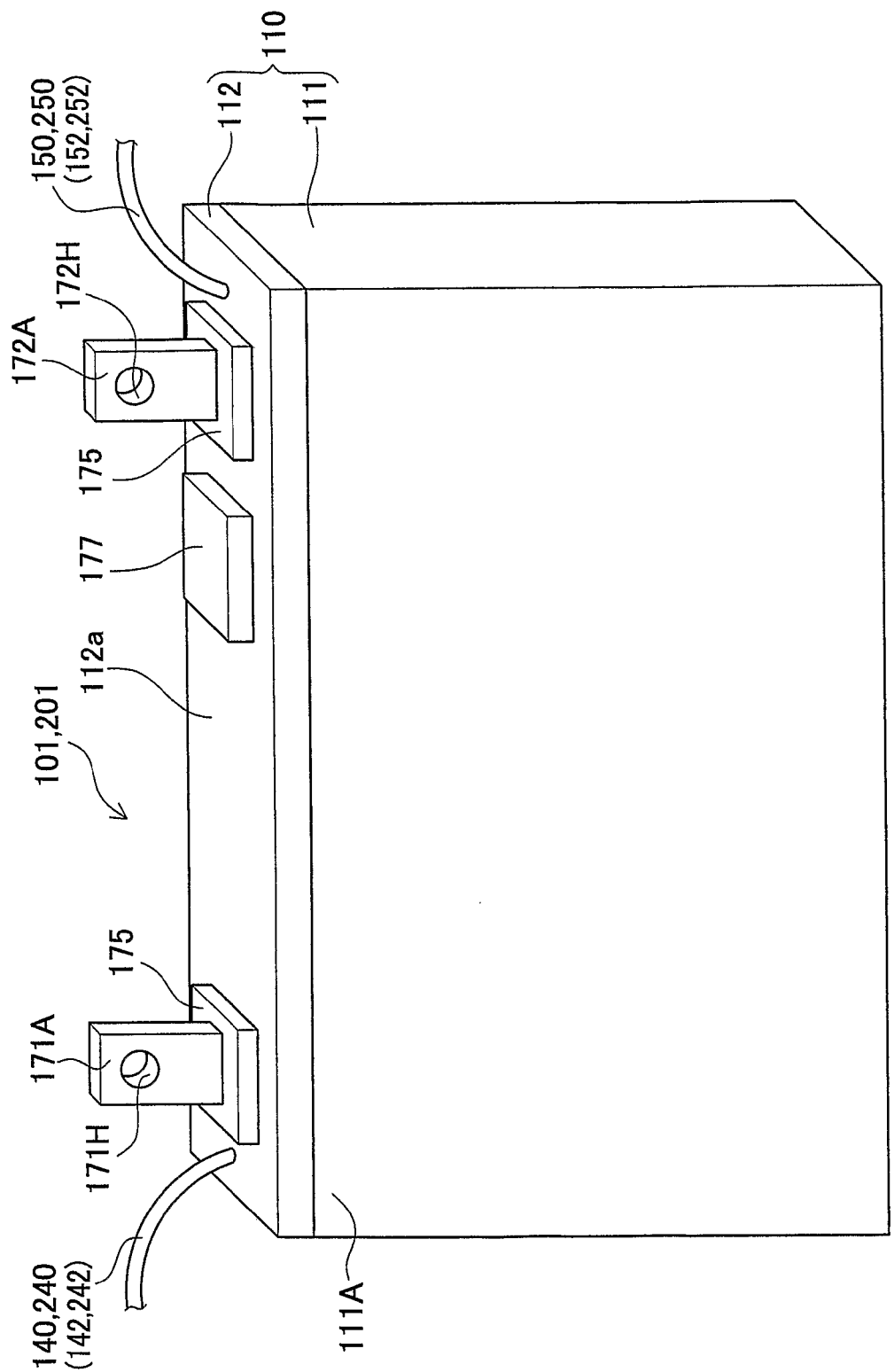
FIG. 3 is a perspective view of a battery in a battery system of the first embodiment.
Figure 4:
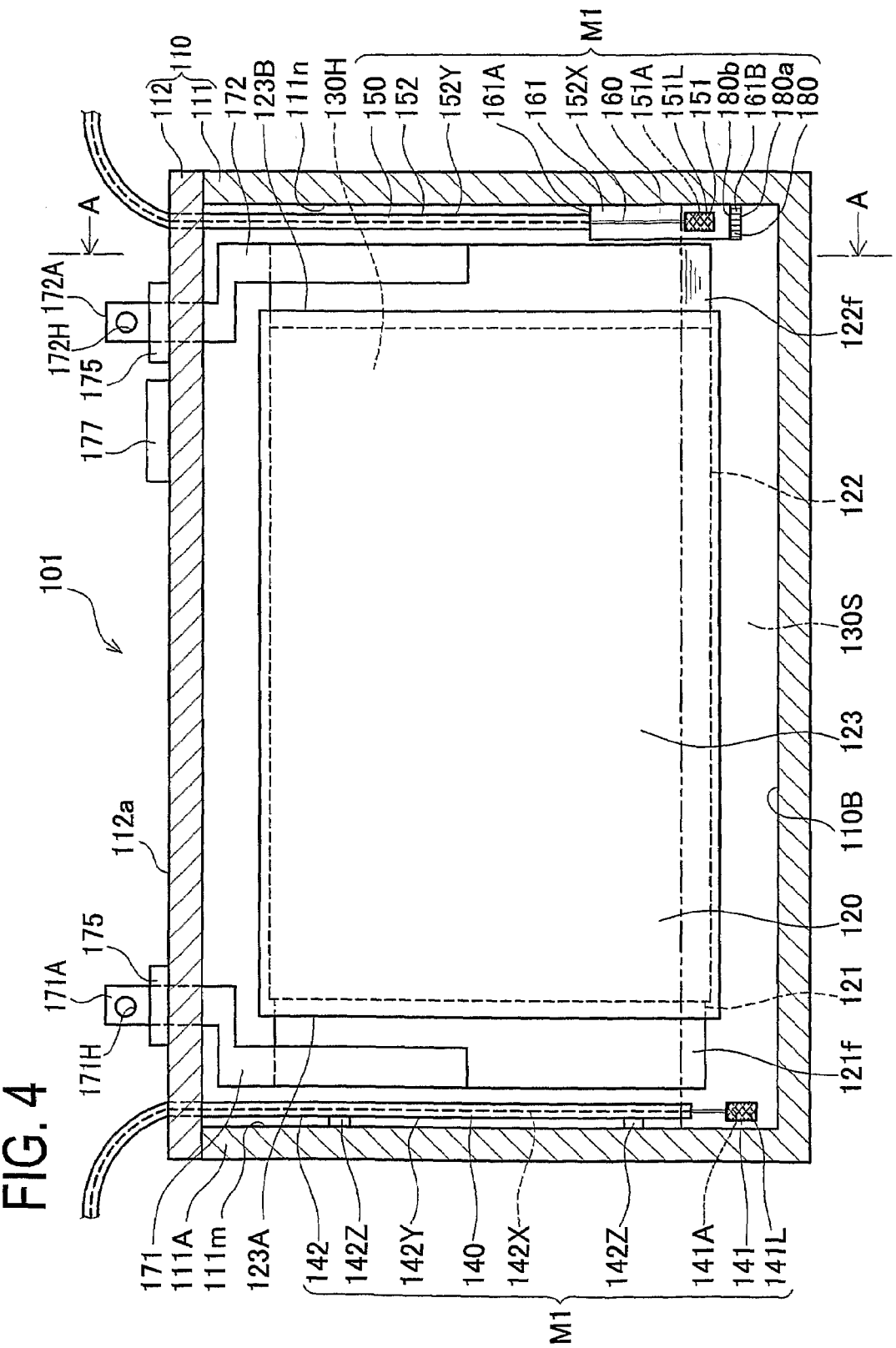
FIG. 4 is a partial sectional view of the battery in the battery system of the first embodiment.

The closing lid 112 has a rectangular plate shape to close an opening 111A of the case body 111, and is welded to the case body 111 (see FIGS. 3 and 4). A positive current collector 171 and a negative current collector 172 connected to the power generating element 120 have a positive terminal 171A and a negative terminal 172A respectively at the tips so as to penetrate the closing lid 112 and protrude from an upper surface 112a. Insulating members 175 made of resin respectively intervene in between the positive terminal 171A and the closing lid 112, and between the negative terminal 172A and the lid 112 to insulate the respective terminals from the lid 112. In the battery part 11 of the battery pack 10, the batteries 101 and 102 are connected to each other in series by bolt fastening via the bus bar 190 using fastening holes 171H and 172H of the terminals 171A and 172A (see FIG. 2).

A first lead wire (conducting wire) 142 of a first measurement electrode 140 and a second lead wire (conducting wire) 152 of a second measurement electrode 150 to be described later penetrate the closing lid 112 to protrude from the upper surface 112a (see FIGS. 3 and 4). A rectangular plate-like relief valve 177 is sealed and attached to the closing lid 112.

Figure 5:
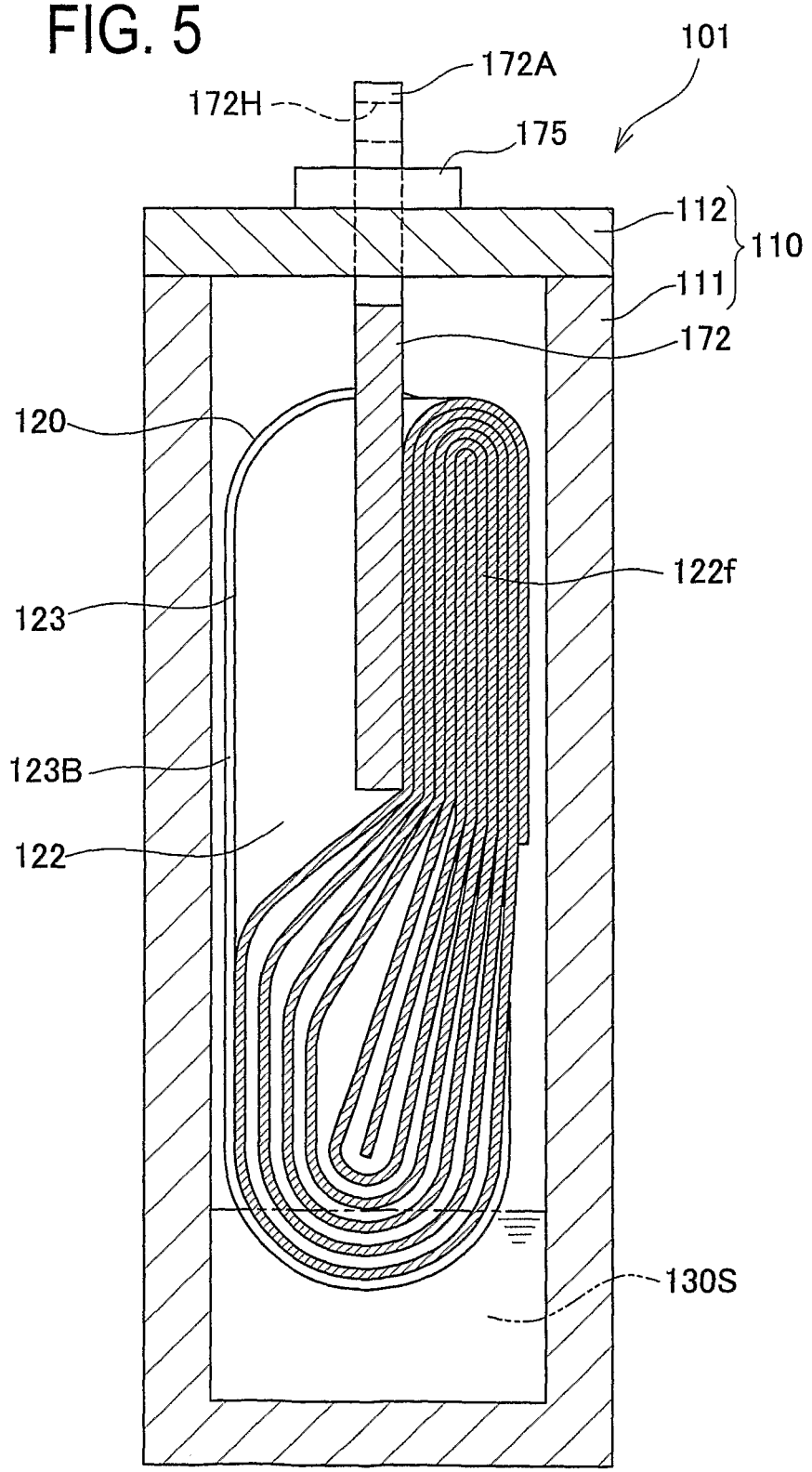
FIG. 5 is a sectional view (along a line A-A) of the battery in the battery system of the first embodiment.

The power generating element 120 is constructed in a flat shape by winding a strip-like positive electrode plate 121 and a strip-like negative electrode plate 122 while interposing a strip-like separator 123 made of polyethylene therebetween (see FIG. 5). The positive electrode plate 121 and the negative electrode plate 122 of the power generating element 120 are coupled with the plate-like positive current collector 171 and the plate-like negative current collector 172, respectively, which are bent in a crank shape. Specifically, as shown in FIG. 5, about a half of a negative lead portion 122$f$ (an upper portion thereof as shown in FIG. 5) made of copper foil and protruding from a second edge 123B of the separator 123 of the negative electrode plate 122 is welded in contact with the negative current collector 172. Likewise, a positive lead portion 121$f$ of the positive electrode plate 121 is welded to the positive current collector 171, like the negative lead portion 122$f$.

The positive electrode plate 121 carries a positive active material layer (not shown) on both surfaces thereof, leaving a positive lead portion 121$f$ along one long side of the strip-like alumina foil. The positive active material layer contains lithium nickelate ($LiNiO_2$) as a positive active material, acetylene black as a conductive agent, and polytetrafluoroethylene (PTFE) and carboxymethyl cellulose (CMC) as a binder. The ratio of mass of these elements in the positive active material layer is as follows: 90% by weight of $LiNiO_2$, 7% by weight of acetylene black, 1% by weight of PTFE, and 2% by weight of CMC. The negative electrode plate 122 carries a negative active material layer (not shown) on both surfaces thereof, leaving a negative lead portion 122$f$ along one long side of the strip-like copper foil. The negative active material layer contains graphite and a binder.

The electrolyte 130 is an organic electrolyte produced by mixing ethylene carbonate (EC) and ethyl methyl carbonate (EMC) at a ratio of volume of EC:EMC=3:7 to make a mixed organic solvent, and then adding $LiPF_6$ thereto as a solute such that the concentration of lithium ions is 1 mol/L.

In the first embodiment, the electrolyte 130 is classified according to the position where the electrolyte is retained as follows. That is, the electrolyte retained between the positive electrode plate 121 and the negative electrode plate 122 of the above-mentioned power generating element 120 is hereinafter referred to as a retained electrolyte 130H. More electrolyte than the electrolyte retained by the power generating element 120 is injected into the battery case 110. As shown in FIG. 4, the electrolyte stored in a lower portion 110B inside the battery case 110 between the power generating element 120 and the battery case 110 so that the electrolyte is interconnected with the retained electrolyte 130H is hereinafter referred to as a stored electrolyte 130S.

Next, the concentration difference electromotive force measurement means M1 will be described below. The concentration difference electromotive force measurement means M1 includes the first measurement electrode 140 immersed in the stored electrolyte 130S, a reference electrolyte 160, a cylindrical case 161 accommodating therein the reference electrolyte 160, a second measurement electrolyte 150 immersed in the reference electrolyte 160, and a filter 180 for separating the stored electrolyte 130S from the reference electrolyte 160 (see FIG. 4).

The first measurement electrode 140 includes a first electrode main part 141 having the rectangular mesh-shaped carrier 141A made of nickel holding a first metal plate 141L made of lithium metal on both sides thereof. Similarly, the second measurement electrode 150 includes a second electrode main part 151 having the rectangular mesh-shaped carrier 151A made of nickel holding a second metal plate 151L made of lithium metal on both sides thereof. The first and second electrodes 140 and 150 also include the first lead wire 142 and the second lead wire 152, respectively. The first lead wire 142 and the second lead wire 152 have nickel wires 142X and 152X connected with the electrode main parts 141 and 151, and coating members 142Y and 152Y made of insulating resin which coating the wires 142X and 152X respectively.

The first electrode main part 141 of the first measurement electrode 140 is immersed in the above-mentioned stored electrolyte 130S. On the other hand, in the second measurement electrode 150, the second electrode main part 151 and a part of the second lead wire 152 are held in a cylindrical case 161 made of glass. The reference electrolyte 160 having the same composition as that of the above-mentioned electrolyte 130 is sealed in the cylindrical case 161. Specifically, the electrolyte 160 is made by mixing ethylene carbonate (EC) and ethyl methyl carbonate (EMC) at a ratio of volume of EC:EMC=3:7 to make a mixed organic solvent, and adding $LiPF_6$ to the mixed solvent as a solute such that the concentration BC of lithium ions (hereinafter singly referred to as a "concentration") is a reference concentration of 1 mol/L. Thus, the second electrode main part 151 of the second measurement electrode 150 is immersed in the reference electrolyte 160 in the cylindrical case 161.

The above-mentioned cylindrical case 161 has a bottom 161B immersed in the stored electrolyte 130S as shown in FIG. 4. The bottom 161B of the cylindrical case 161 is provided with a filter 180 made of a porous glass plate. The filter 180 prevents ion movement caused by a difference in concentration between the stored electrolyte 130S and the reference electrolyte 160, and a potential between the stored electrolyte 130S and the reference electrolyte 160 can be measured by the first measurement electrode 140 and the second measurement electrode 150.

The first lead wire 142 of the first measurement electrode 140 is fixed to a first side portion 111m of the case body 111 via two fixing members 142Z made of resin. Thus, the first electrode main part 141 of the first measurement electrode 140 is prevented, for example, from contacting the power generating element 120, which can suppress occurrence of short circuit in the battery 101. Likewise, the second lead wire 152 of the second measurement electrode 150 is fixed. In contrast, the cylindrical case 161 is bonded to a second portion 111n of the case body 111.

The concentration difference electromotive force measurement means M1 uses the stored electrolyte 130S and the reference electrolyte 160 to constitute a concentration cell, and measures an electromotive force VP to be described later, thereby enabling detection of a lithium ion concentration SC of the stored electrolyte 130S. Thus, the magnitude and level of the internal resistance IR of the battery 101 can be estimated. Further, the level of the lithium ion concentration HC of the retained electrolyte 130H can be estimated. In the first embodiment, the lithium ion concentration SC of the stored electrolyte 130S has a correlation with the internal resistance IR of the battery 101, and corresponds to a resistance correlation physical quantity.

The inventors manufactured batteries that have the same structure as the battery 101 but different lithium ion concentrations SC of the electrolyte 130 (stored electrolyte 130S) in the battery case 110. An electromotive force VP caused between the first electrode main part 141 and the second electrode main part 151 of the corresponding battery was measured. Specifically, the first lead wire 142 of the first measurement electrode 140 and the second lead wire 152 of the second measurement electrode 150 were connected to a voltmeter thereby to measure the electromotive force VP.

Figure 6:
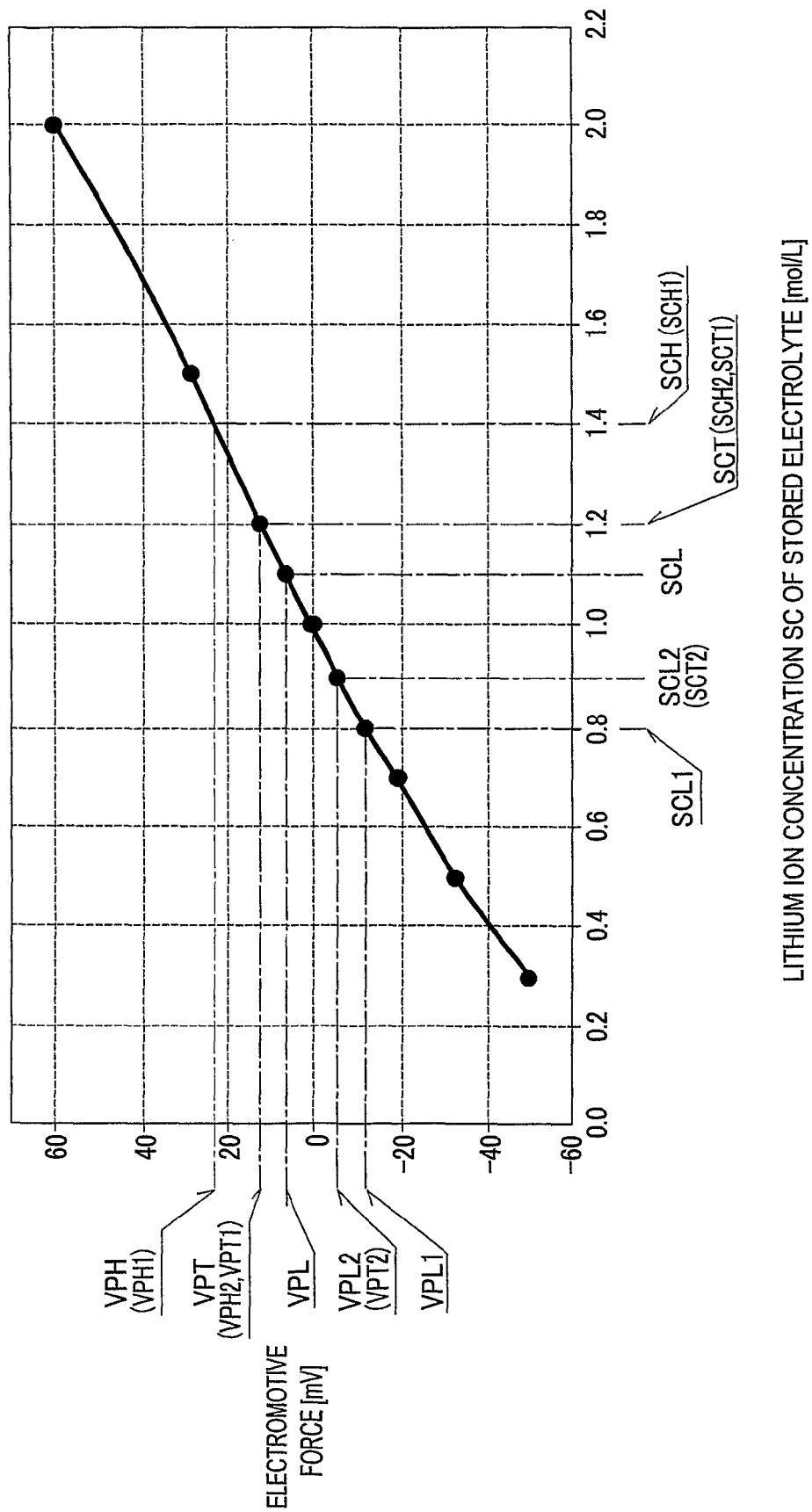
FIG. 6 is a graph showing a relationship between a lithium ion concentration in a stored electrolyte and an electromotive force of concentration difference electromotive force measuring means in the battery system of the first embodiment.

The result is shown in FIG. 6. FIG. 6 is a graph showing a relationship between a lithium ion concentration SC of the stored electrolyte 130S and an electromotive force VP caused between the first electrode main part 141 and the second electrode main part 151. As can be seen from the graph, a positive correlation is found to exist between the lithium ion concentration SC of the stored electrolyte 130S and the electromotive force Vp between the electrode bodies 141 and 151.

Then, the inventors performed a charge and discharge cycle test (a charge and discharge test A) of the battery 101 according to the first embodiment.

The charge and discharge test A was performed by charging and discharging the battery 101 based on the following charge and discharge pattern. Specifically, a pulse charge and discharge cycle test was performed which involves standing the battery 101 still in a constant temperature bath controlled to have an ambient temperature of 25° C., and performing discharging at 20 C for 10 seconds and charging at 4 C for 50 seconds with the battery SOC of 50% being centered.

After performing the charge and discharge test A as described above, the internal resistance IR of the battery 100 and the lithium ion concentration SC of the stored electrolyte 130S were measured.

Specifically, the internal resistance IR of the battery was determined from the voltage and the magnitude of current of a battery obtained after prepared to have a battery SOC of 50% and then being discharged at a discharge rate of 20 C for 10 seconds at the ambient temperature of 25° C. The lithium ion concentration SC of the stored electrolyte 130S was obtained by measuring the electromotive force VP caused between the first electrode main part 141 and the second electrode main part 151 by the voltmeter connected to the first and second measurement electrodes 140 and 150, and by converting the measured electromotive force VP to the lithium ion concentration SC with reference to the graph shown in FIG. 6.

Further, after the measurement of the internal resistance and the lithium ion concentration as described above, a charge and discharge test B that is different from the charge and discharge test A was performed.

The charge and discharge test B was performed by charging and discharging the battery 101 based on the following charge and discharge pattern. Specifically, a pulse charge and discharge cycle test was performed which involves standing the battery 101 still in a constant temperature bath controlled to have the ambient temperature of 25° C., and performing discharging at 1 C for 200 seconds and charging at 20 C for 10 seconds with the battery SOC of 50% being centered.

After performing the above-mentioned charge and discharge test B, the internal resistance IR of the battery 101 and the lithium ion concentration SC of the stored electrolyte 130S were measured under the same measurement conditions as those performed in the charge and discharge test A.

Figure 7:
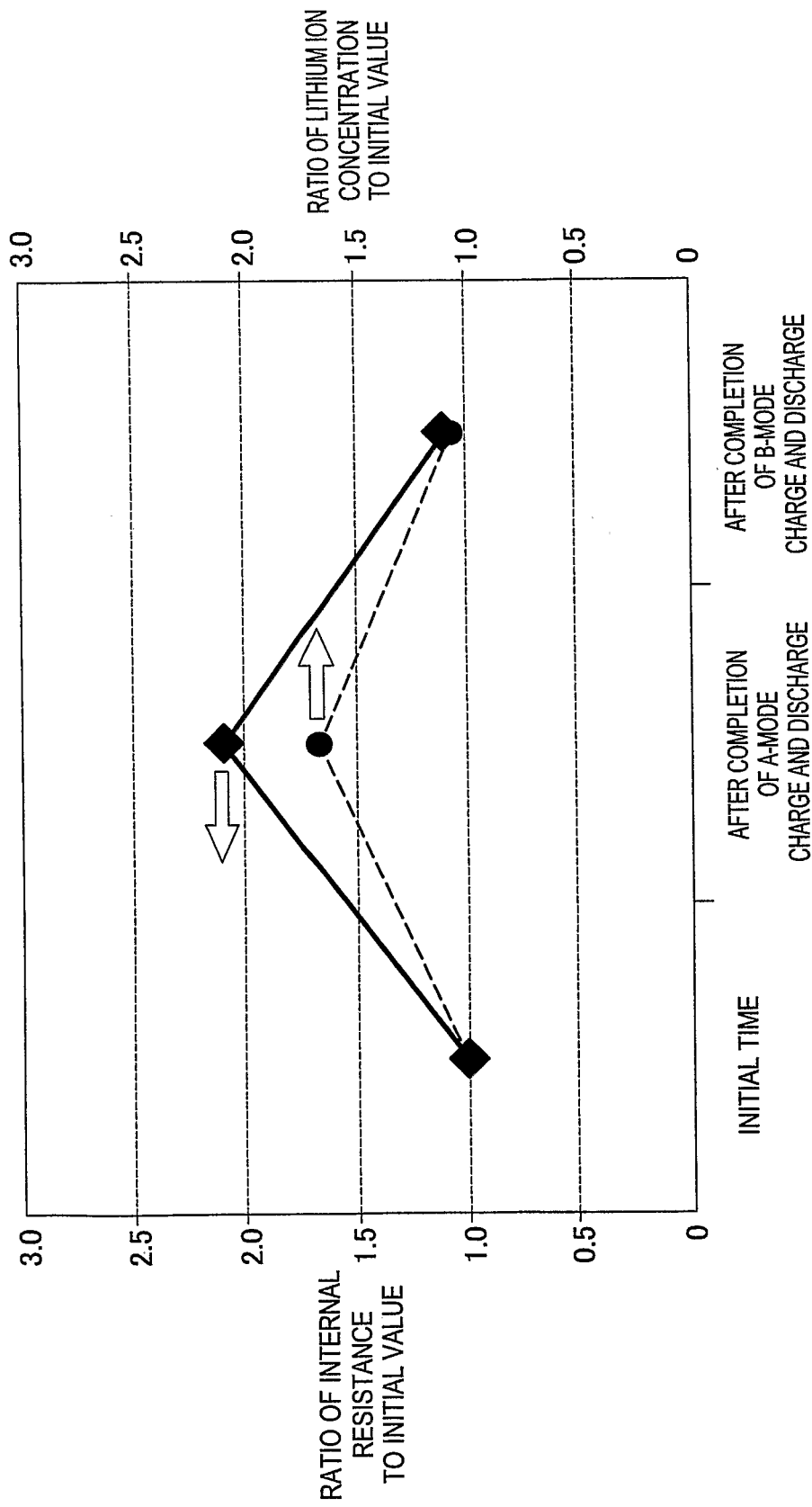
FIG. 7 is a graphs showing transition of a ratio of internal resistance to initial value and a ratio of lithium ion concentration to initial value before and after charge and discharge tests A and B on the battery in the battery system of the first embodiment.

The test result is shown in FIG. 7. FIG. 7 shows a ratio of internal resistance to initial value determined by dividing internal resistances IR of the battery 101 "before the charge and discharge test A" (hereinafter referred to as an "initial time"), "after the charge and discharge test A", and "after the charge and discharge test B", by the internal resistance at the initial time. Likewise, the lithium ion concentration SC is also designated by a ratio of lithium ion concentration to initial value standardized by the concentration at the initial time.

The graph shows that the repeated charging and discharging the battery 101 according to the charge and discharge pattern of the charge and discharge test A leads to a gradual increase in internal resistance IR. Further, it is also found that the repeated charging and discharging of the battery according to the charge and discharge pattern of the charge and discharge test B leads to a gradual decrease in internal resistance IR of the battery 101, whereby the increased internal resistance IR can be restored to a lower value.

As shown in FIG. 7, the lithium ion concentration SC of the stored electrolyte 130S (the ratio of lithium ion concentration to initial value) is also found to have the same tendency as that of the internal resistance IR of the battery 101 (the ratio of internal resistance to initial value). That is, the repeated charging and discharging of the battery according to the charge and discharge pattern of the charge and discharge test A can lead to an increase in concentration SC, while the repeated charge and discharge according to the charge and discharge pattern of the test B can lead to a decrease in concentration SC.

This is generalized as follows: in repeatedly charging and discharging the batteries 101 and 102, the relative large in discharge current tends to increase the internal resistance IR. In contrast, the relative small in discharge current rather decreases the internal resistance IR. Conversely, the relative small in charge current can increase the internal resistance IR. On the other hand, it is found that as the charge current is relatively large, the internal resistance IR can be decreased.

Further, the inventors performed a combination of the above charge and discharge test A and the above charge and discharge test B of the above-mentioned battery 101 so as to allow the battery 101 to have different resistances IRs, and then measured the lithium ion concentration SC of each of the stored electrolytes 130S.

Figure 8:
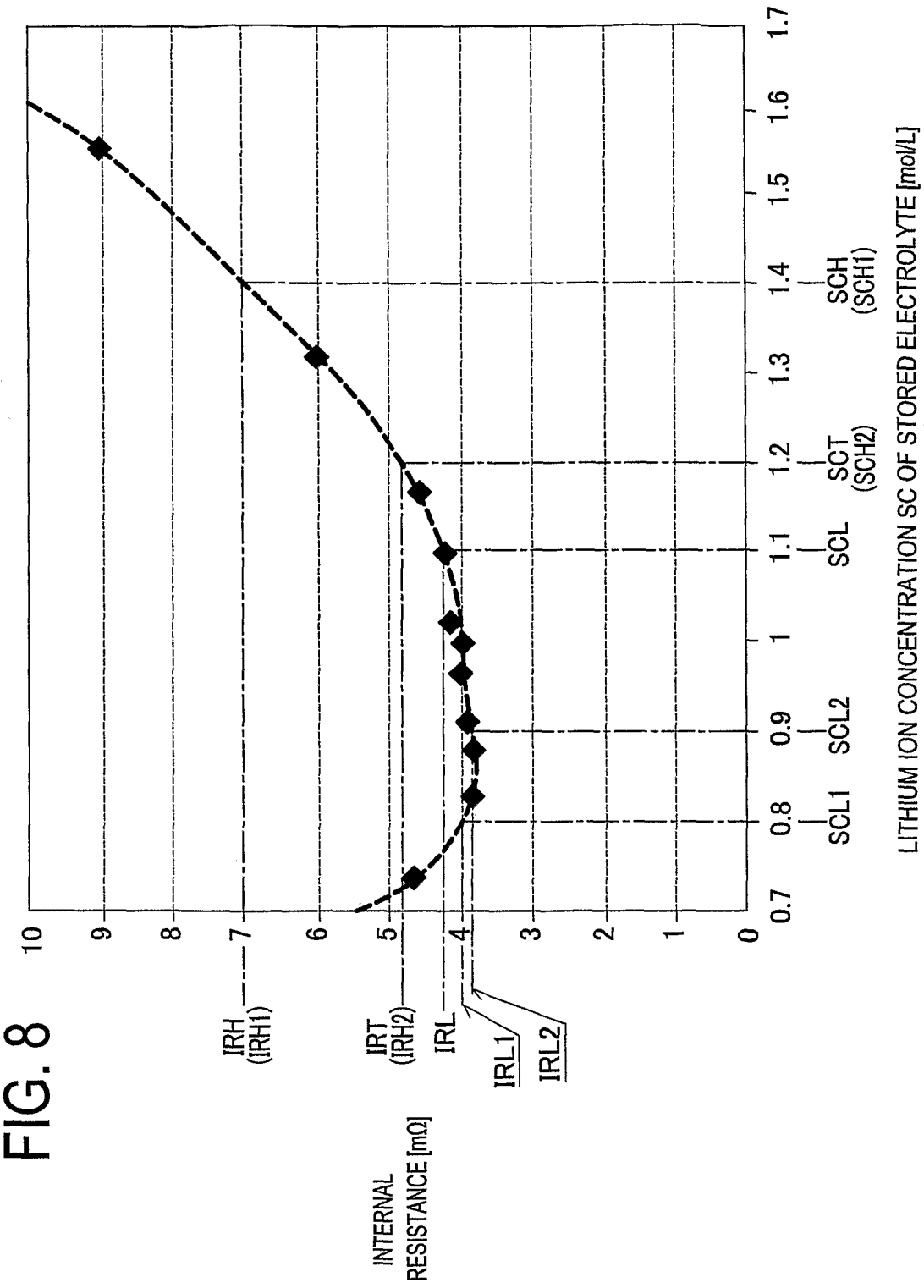
FIG. 8 is a graph showing a relationship between the lithium ion concentration in the stored electrolyte and the internal resistance of the battery in the battery system of the first embodiment.

The above-mentioned test result is shown in FIG. 8. FIG. 8 is a graph showing a relationship between a lithium ion concentration SC of the stored electrolyte 130S, and an internal resistance IR of the battery 101. The graph shows that the higher the lithium ion concentration SC of the stored electrolyte 130S, the higher the internal resistance IR of the battery 101 as a whole. More specifically, the battery 101 in which a lithium ion concentration SC of the stored electrolyte 130S is equal to or more than 1.2 mol/L has a positive correlation that the higher the lithium ion concentration SC, the higher the internal resistance IR. On the other hand, for the lithium ion concentration of 0.8 to 1.1 mol/L, even the increase in lithium ion concentration SC slightly increases or hardly changes the internal resistance IR, and keeps a low value of the resistance. Further, for the lithium ion concentration below 0.8 mol/L, the decrease in lithium ion concentration SC leads to the increase in internal resistance IR.

The lithium ion concentration HC of the retained electrolyte 130H retained between the positive electrode plate 121 and the negative electrode plate 122 of the battery 101, and the lithium ion concentration SC of the stored electrolyte 130S are found to have opposite relationships with respect to the internal resistance IR.

That is, for the high internal resistance IR of the battery 101, the lithium ion concentration SC of the stored electrolyte 130S becomes high as mentioned above (see FIG. 8), but the lithium ion concentration HC of the retained electrolyte 130H conversely becomes low.

On the other hand, for the low internal resistance IR of the battery 101, the lithium ion concentration SC of the stored electrolyte 130S becomes low, but the lithium ion concentration HC of the retained electrolyte 130H conversely becomes high. Such a behavior is considered as being exhibited by the movement of the lithium ions between the retained electrolyte 130H and the stored electrolyte 130S.

As can be seen from the above results and consideration, the vehicle 100 of the first embodiment includes a vehicle battery system SV1 which controls charging and discharging of the battery 101 and 102 to suppress an increase in internal resistance of the battery 101 and 102, or to reduce and restore the internal resistance, thereby restraining the internal resistance within an appropriate range. The vehicle battery system SV1 includes the above-mentioned assembled battery 10, the HV controller 20, the front motor 30, the rear motor 40, the engine 50, the cable 60, and the inverter 70.

Specifically, the operation of the vehicle battery system SV1 will be described below with reference to the flowchart shown in FIG. 9.

First, when the vehicle 100 is actuated (KEY ON) (step S1), the CPU of the HV controller 20 is started up to operate according to a program for controlling the vehicle battery system SV1. Then, the HV controller 20 selects the charging and discharging of the assembled battery 10 in an S mode (step S2). For example, in order to supply power required for the motors 30 and 40, the charge and discharge control in the S mode is executed to discharge the current corresponding to the power from the assembled battery 10 to the inverter 70 or charge the assembled battery 10 with the power supplied from the motors 30 and 40, or the engine 50 via an inverter 70.

The HV controller 20 limits the maximum discharge current IDmax to be discharged from the battery pack 10 to 200 A under a discharge condition corresponding to sudden acceleration, sudden starting of the vehicle 100, or the like in the charge and discharge control in the S mode. The HV controller 20 limits the maximum charge current ICmax to be charged to the battery pack 10 to 200 A under a charge condition corresponding to charging to the assembly battery 10 by the engine 50, or braking of the vehicle 100.

The HV controller 20 has itself a timer (not shown), and thus determines whether predetermined timing, for example, every 10 days, for detecting a lithium ion concentration SC of the stored electrolyte 130S of the battery 101 has come or not in step S3. If NO, that is, when the timing for detecting the lithium ion concentration SC has not come, the operation returns to step S3. In contrast, if YES in step S3, that is, when the timing for detecting the lithium ion concentration SC has come, the operation proceeds to step S4, in which the electromotive force VP caused between the first and second electrode bodies 141 and 151 is measured by use of the concentration difference electromotive force measurement means M1 of the battery 101.

Figure 10:
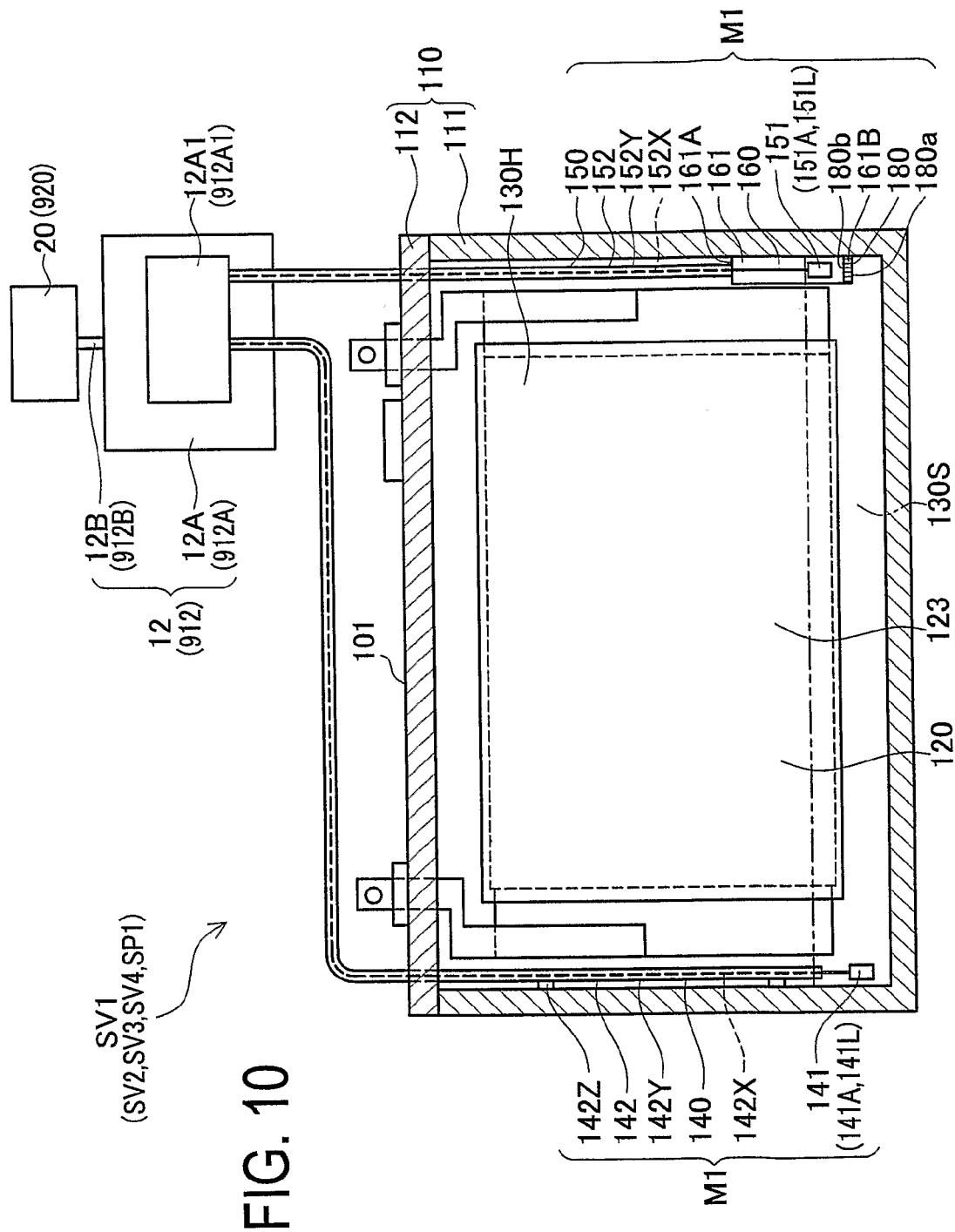
FIG. 10 is an explanatory view of the battery system in the first embodiment.

FIG. 10 shows selectively the HV controller 20, the battery monitoring device 12, and the battery 101 in the above-mentioned vehicle battery system SV1. The battery monitoring device 12 includes a battery monitoring body 12A containing an electromotive force obtaining circuit 12A1, and establishes communication with the HV controller 20 by being connected to the HV controller 20 via a communication cable 12B. The monitoring device 12 is connected to the concentration difference electromotive force measurement means M1 of the battery 101, thereby detecting an electromotive force VP between the first and second electrode bodies 141 and 151. The electromotive force VP detected is sent to the HV controller 20 via the communication cable 12B.

In step S4, the above-mentioned concentration difference electromotive force measurement means M1 measures the electromotive force VP. After measuring the electromotive force VP, it is determined whether or not the vehicle battery system SV1 performs the charge and discharge control in the S mode (step S5). If YES, that is, when the charge and discharge control in the S mode is performed, the operation proceeds to step S6. On the other hand, if NO, that is, when the charge and discharge control in a T1 mode to be described later is performed, the operation proceeds to step S7.

In step S6, the HV controller 20 determines whether or not the electromotive force VP is larger than a high electromotive force threshold VPH. In the first embodiment, the VPH is, for example, 24 mV (VPH=24 mV) (see FIG. 6). This value (24 mV) corresponds to a case where a lithium ion concentration SC of the stored electrolyte 130S has the high concentration threshold SCH (=1.4 mol/L). Further, this value corresponds to a case where the internal resistance IR of the battery 101 has a high resistance threshold IRH (=7.0 mΩ) as illustrated in FIG. 8.

Figure 9:
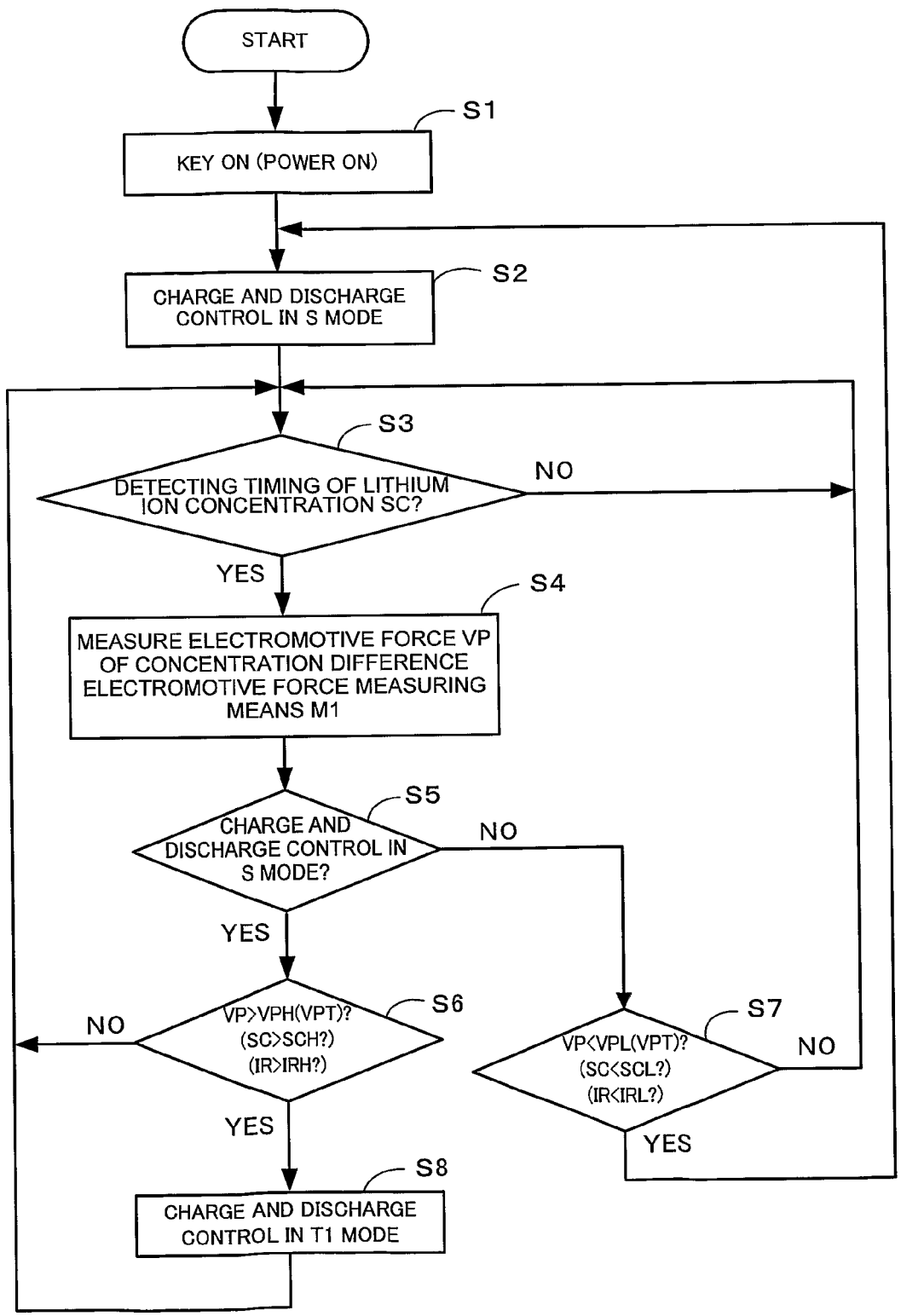
FIG. 9 is a flowchart of the battery system in the first and second embodiments.

Thus, whether or not the lithium ion concentration SC is larger than the high concentration threshold SCH can be estimated by determining whether or not the electromotive force VP is larger than the high electromotive force threshold VPH (see FIG. 9). Further, whether or not the internal resistance IR of the battery 101 is larger than the high resistance threshold IRH can be estimated by estimating whether or not the concentration SC is larger than the high concentration threshold SCH (see FIG. 9).

If NO, that is, when the electromotive force VP is equal to or less than the high electromotive force threshold VPH (VP≤VPH), the operation returns to step S3, and the above-mentioned processing will be repeated.

On the other hand, if YES, that is, when the electromotive force VP is larger than the high electromotive force threshold VPH (VP>VPH), the operation proceeds to step S8, in which the charge and discharge control in the T1 mode is performed for the battery pack 10. Even in the T1 mode, almost the same control as that in the above-mentioned S mode is performed.

It is to be noted that the control in the T1 mode sets an upper limit of the discharge current IDu to be discharged from the battery pack 10 to a value by 20% smaller than a value of the maximum discharge current IDmax in control of the S mode under discharge conditions, such as sudden acceleration or sudden starting of the vehicle 10. That is, in sudden acceleration or sudden starting of the vehicle 100, the HV controller 20 may discharge the maximum discharge current IDmax in the S mode control. However, in such a discharge condition, the HV controller 20 discharges only the upper limit discharge current IDu (=0.8×IDmax, for example, 160 A) in the T1 mode control. The shortage of power output from the motors 30 and 40 due to this control is compensated, for example, by changing an operating condition of the engine 50.

In the first embodiment, as to charging, the S mode and the T1 mode do not differ from each other in control of the charging.

In this way, while the vehicle 100 is traveling, the charge and discharge control of the battery pack 10 in the T1 mode continues for a long time to some degree (for example, for three or more months). As can be seen from the above consideration, during this time, the lithium ion concentration SC of the stored electrolyte 130S gradually decreases as compared to a case of the charge and discharge control in the S mode. Conversely, the lithium concentration HC of the retained electrolyte 130H gradually increases. Further, this can stop increasing or rather gradually reduce the internal resistance IR of the respective batteries 101 and 102.

In contrast, in step S7, the HV controller 20 determines whether or not the electromotive force VP is smaller than the low electromotive force threshold VPL. In the first embodiment, the VPL is 7 mV (VPH=7 mV) (see FIG. 6). This value (7 mV) corresponds to a case where a lithium ion concentration SC of the stored electrolyte 130S is a low concentration threshold SCL (=1.1 mol/L). Further, this value corresponds to a case where the internal resistance IR of the battery 101 is a low resistance threshold (=4.2 mΩ) as illustrated in FIG. 8.

Thus, whether or not the concentration SC is smaller than the low concentration threshold SCL can be estimated by determining whether or not the electromotive force VP is smaller than the low electromotive force threshold VPL (see FIG. 9). Further, whether or not the internal resistance IR of the battery 101 is smaller than the high resistance threshold IRH can be estimated by estimating whether or not the concentration SC is smaller than the high concentration threshold SCH (see FIG. 9).

If NO, that is, when the electromotive force VP is equal to or more than the low electromotive force threshold VPL (VP≥VPL), the operation returns to step S3, in which the processing in the T1 mode is repeated.

If YES, that is, when the electromotive force VP is smaller than the low electromotive force threshold VPL (VP<VPL), the operation returns to step S2, and thereafter the charge and discharge control in the S mode is performed.

In this way, the vehicle battery system SV1 of the first embodiment includes the concentration difference electromotive force measurement means M1, control means S2 in the S mode, control means S8 in the T1 mode, and mode selecting means S6 and S7. Thus, for example, when the internal resistance IR of the battery 101 gradually increases to become relatively high by controlling the charging and discharging of an battery pack 10 (the battery 101 and others) by the control means S2 in the S mode, that is, when the electromotive force VP becomes higher than the high electromotive force threshold VPH, the charge and discharge control in the S mode can be switched to the charge and discharge control by the control means S8 in the T1 mode, thereby decreasing the internal resistance IR to restore the degradation of the battery 101. Together with this, the electromotive force VP and the concentration SC can be gradually reduced.

Conversely, when the internal resistance IR of the battery 101 gradually decreases to become relatively low by the charge and discharge control by the control means S8 in the T1 mode, that is, when the electromotive force VP becomes lower than the low electromotive force threshold VPL, the charge and discharge control in the T1 mode is switched to the charge and discharge control by the control means S2 in the S mode, which can prevent the internal resistance IR from excessively decreasing. Alternatively, in such a case, the control by the control means in the T1 mode for decreasing the internal resistance IR is continued, which can prevent the internal resistance IR from rather increasing. Together with this, the electromotive force VP and the concentration SC can be gradually increased.

Thus, this embodiment controls the electromotive force VP within a range of about 7 to 24 mV, the lithium ion concentration SC of the stored electrolyte 130S within a range of about 1.1 to 1.4 mol/L, and the internal resistance IR of the battery 101 within a range of about 4.2 to 7.0 mΩ.

Thus, this embodiment can prevent the battery 101 and others from being degraded due to the continuous increase in internal resistance IR of the batteries 101 and 102, thereby constantly restraining the internal resistance IR within an appropriate range.

The vehicle battery system SV1 allows a discharge current (upper limit discharge current IDu) smaller than the maximum discharge current IDmax to flow therethrough during discharging by use of the control means S8 in the T1 mode under a predetermined discharge condition, that is, on a discharge condition corresponding to a ease where the control means S2 in the S mode allows the maximum discharge current IDmax to flow therethrough. Thus, two mode control means (the control means S2 in the S mode and the control means S8 in the T1 mode) in which changing tendencies of respective internal resistances IRs are reverse to each other can be easily achieved.

Stored electrolyte concentration detecting means has the concentration difference electromotive force measurement means M1 including the first measurement electrode 140 (the first electrode main part 141) immersed in the stored electrolyte 130S, and the second measurement electrode 150 (the second electrode main part 151) immersed in the reference electrolyte 160. Thus, the internal resistance IR can be relatively easily measured by estimating the internal resistance IR based on an appropriate physical quantity (the lithium ion concentration SC of the stored electrolyte 130S) having a correlation with the internal resistance IR of the batteries 101 and 102.

The concentration difference electromotive force measurement means M1 can easily and appropriately determine the lithium ion concentration SC of the stored electrolyte 130S from the magnitude of the electromotive force VP between the first and second electrode bodies 141 and 151, and the known lithium ion concentration BC of the reference electrolyte 160. Further, the level of the lithium ion concentration HC of the retained electrolyte 130H having the correlation with the stored electrolyte 130S can be estimated. Based on the concentration, the level of the internal resistance IR of the battery 101 can be estimated.

The vehicle 100 according to the first embodiment mounts the above-mentioned vehicle battery system SV1 thereon, and thus can surely suppress the increase in internal resistance IR of the batteries 101 and 102 mounted, or can surely reduce and restore the internal resistance, thereby restraining the internal resistance IR within the appropriate range. Therefore, the vehicle 100 can keep good driving performance.

In this embodiment, the vehicle battery system SV1 corresponds to a battery system. The concentration difference electromotive force measurement means M1 corresponds to internal resistance detecting means, resistance correlation physical quantity detecting means, and stored electrolyte concentration detecting means. The control means S2 in the S mode corresponds to increasing mode control means or first mode control means. The control means S8 in the T1 mode corresponds to decreasing mode control means or second mode control means.

In the first embodiment, switching between the S mode and T1 mode uses two thresholds (VPH, and VPL) to set the high electromotive force threshold VPH to 24 mV, and the low electromotive force threshold VPL to 7 mV apart from the above value. However, the control can be performed using one electromotive force threshold VPT (for example, VPT=13 mV (which corresponds to concentration threshold SCT=1.2 mol/L, and resistance threshold IRT=4.7 mΩ)) for the electromotive force VP (see FIG. 9). In this case, the control is performed such that the electromotive force VP is about 13 mV, the lithium ion concentration SC of the stored electrolyte 130S is about 1.2 mol/L, and the internal resistance IR of the battery 101 is about 4.7 mΩ.

First Modified Embodiment

Figure 11:
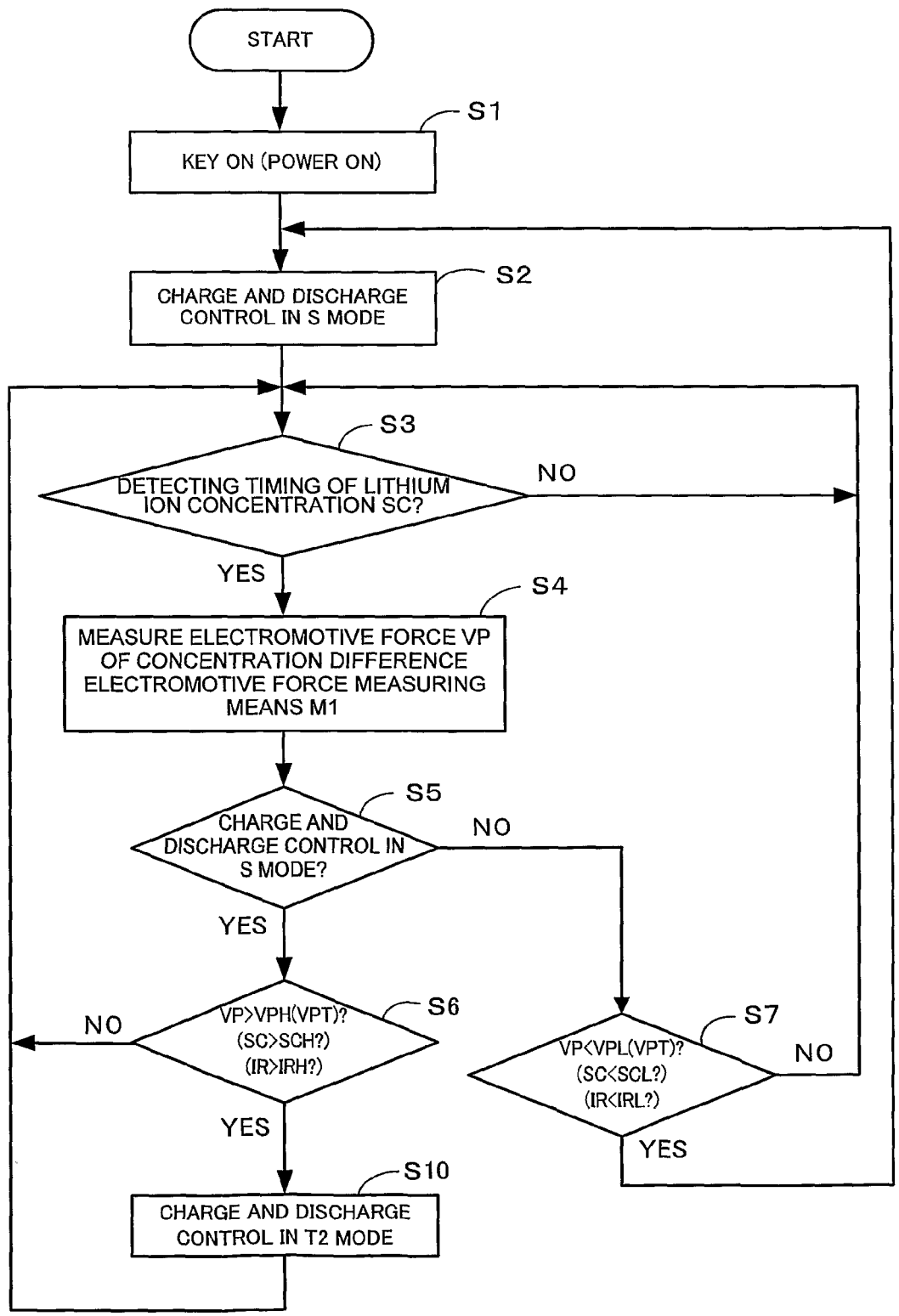
FIG. 11 is a flowchart of a battery system in the first modified embodiment.

Now, a vehicle according to a first modified embodiment of the invention will be described below with reference to FIGS. 1 and 11.

A vehicle 200 of the first modified embodiment has the same structure as that of the above first embodiment except for contents regarding the charge and discharge control of the vehicle battery system. Specifically, in the T1 mode of the first embodiment, the upper limit discharge current IDu by 20% lower than the maximum discharge value IDmax in the S mode is provided for controlling the discharge current of the battery pack. On the other hand, in the first modified embodiment, control is performed to equally limit the value of discharge current of the battery pack.

Accordingly, the following explanation is focused on the differences, and similar or identical parts to those in the first embodiment are not explained or briefly described. It is to be noted that the similar or identical parts provide the same operations and advantages as those in the first embodiment. The same contents are explained with the same reference signs.

The vehicle 200 of the first modified embodiment includes a vehicle battery system SV2 which controls the charging and discharging of the batteries 101 and 102 to suppress an increase in internal resistance IR of the batteries 101 and 102 or to reduce and restore the internal resistance IR, thereby restraining the internal resistance IR within an appropriate range (see FIG. 1). Like the first embodiment, the vehicle battery system SV2 includes the above-mentioned battery pack 10, the HV controller 20, the front motor 30, the rear motor 40, the engine 50, the cable 60, and the inverter 70. The charge and discharge control of the battery pack 10 in the vehicle battery system SV2 is different from that of the vehicle battery system SV1 of the first embodiment.

Specifically, the control of the vehicle battery system SV2 will be described below with reference to the flowchart shown in FIG. 11.

Steps S1 to S7 of the steps shown in FIG. 11 in this modified embodiment are the same as those in the first embodiment, and a description about steps S1 to S5 and S7 will be omitted below.

In step S6, the HV controller 20 determines whether or not the measured electromotive force VP is larger than the high electromotive force threshold VPH.

If NO, that is, when the electromotive force VP is equal to or less than the high electromotive force threshold VPH (VP≤VPH), the operation returns to step S3, in which the above-mentioned processing is repeated.

If YES, that is, when the electromotive force VP is larger than the high electromotive force threshold VPH (VP>VPH), the operation proceeds to step S10, in which the charge and discharge control of the battery pack 10 in the T2 mode is performed. Also in the T2 mode, almost the same control as that in the above-mentioned S mode is performed.

Under the control in the T2 mode, the magnitude of the discharge current to be discharged from the battery pack 10 (batteries 101 and 102) is constantly set by 20% smaller than that of the discharge current under the control in the S mode. That is, the HV controller 20 discharges the battery pack 10 such that the discharge current is equally decreased by 20% under the control in the T2 mode as compared to the discharge under the control in the S mode. The shortage of output from the motors 30 and 40 is also compensated, for example, by changing the operating condition of the engine 50.

In the first modified embodiment, as to the charging, the S mode and the T2 mode do not differ from each other in control of the charging.

As can be seen from the above consideration, when the charge and discharge control of the battery pack 10 in the T2 mode continues for a long time to some degree (for example, three or more months), the lithium ion concentration SC of the stored electrolyte 130S gradually decreases during this time as compared to the case of the charge and discharge control in the S mode. Conversely, the lithium concentration SC of the retained electrolyte 130H gradually increases. Further, this can stop or rather gradually reduce the increase in internal resistance IR of the battery pack 10 (battery 101).

The vehicle battery system SV2 of the vehicle 200 of the first modified embodiment makes the discharge current by control of the control means S10 in the T2 mode smaller than that by the control means S2 in the S mode even on any of the discharge conditions. The control means S10 in the T2 mode can be used to repeatedly perform the charge and discharge to surely suppress the increase in internal resistance IR of the battery 101 and others, and further to gradually decrease the internal resistance IR to restore the degradation of the battery 101 and others. Conversely, the control means S2 in the S mode can be used to repeatedly perform the charge and discharge to gradually increase the internal resistance IR of the battery 101 and others. That is, this arrangement can easily achieve the two mode control means (the control means S2 in the S mode and the control means S10 in the T2 mode) whose changing tendencies of the respective internal resistances IRs are reverse to each other.

The vehicle battery system SV2 corresponds to the battery system.

Second Modified Embodiment

Next, a vehicle according to a second modified embodiment of the invention will be described below with reference to FIGS. 1 and 12.

A vehicle 300 of the second modified embodiment has the same structure as that of the above first embodiment except for contents regarding the charge and discharge control of the vehicle battery system. Specifically, the second modified embodiment differs from the first embodiment in that a U1 mode is provided in addition to the S mode and T1 mode of the first embodiment.

Accordingly, the following explanation is focused on the differences, and similar or identical parts to those in the first embodiment are not explained or briefly described. It is to be noted that the similar or identical parts provide the same operations and advantages as those in the first embodiment. The same contents are explained with the same reference signs.

The vehicle 300 of the second modified embodiment includes a vehicle battery system SV3 which controls the charging and discharging of the batteries 101 and 102 to suppress an increase in internal resistance IR of the battery 101 and others or to decrease and restore the internal resistance IR, thereby restraining the internal resistance IR within an appropriate range (see FIG. 1). Like the first embodiment, the vehicle battery system SV3 includes the above-mentioned battery pack 10, the HV controller 20, the front motor 30, the rear motor 40, the engine 50, the cable 60, and the inverter 70. The charge and discharge control of the battery pack 10 in the vehicle battery system SV3 is different from that of the vehicle battery system SV1 of the first embodiment.

Specifically, the control of the vehicle battery system SV3 will be described below with reference to the flowchart shown in FIG. 12.

Steps S1 to S5 and S8 of the steps shown in FIG. 12 in this modified embodiment are the same as those in the first embodiment, and a description about steps S1 to S4 and S8 will be omitted below.

When the vehicle battery system SV3 performs the charge and discharge control in the S mode in step S5 after measuring the electromotive force VP, then the operation proceeds to step S11. If NO, that is, when the charge and discharge control in the T1 mode or in a U1 mode to be described later is performed, then the operation proceeds to step S15.

In step S11, the HV controller 20 receives the measured electromotive force VP through the electromotive force obtaining circuit 12A1, and determines whether or not the electromotive force VP is larger than the first high electromotive force threshold VPH1.

In the second modified embodiment, the VPH1 is, for example, 24 mV (VPH1=24 mV) (see FIG. 6). This value (24 mV) corresponds to a case where a lithium ion concentration SC of the stored electrolyte 130S is a first high concentration threshold SCH1 (=1.4 mol/L). Further, this value corresponds to a case where the internal resistance IR of the battery 101 has the first high resistance threshold IRH1 (=7.0 mΩ) as illustrated in FIG. 8. Thus, whether or not the concentration SC is larger than the first high concentration threshold SCH1 can be estimated by determining whether or not the electromotive force VP is larger than the first high electromotive force threshold VPH1 (see FIG. 12). Further, whether or not the internal resistance IR of the battery 101 is larger than the first high resistance threshold IRH1 can be estimated by estimating whether or not the concentration SC is larger than the first high concentration threshold SCH1 (see FIG. 12).

If YES, that is, when the electromotive force VP is larger than the first high electromotive force threshold VPH1 (VP>VPH1), the operation proceeds to step S8, in which the charge and discharge control of the battery pack 10 in the T1 mode is performed. The charge and discharge control in the T1 mode is the same as that in the first embodiment. In the second modified embodiment, the S mode and the T1 mode do not differ from each other in control of the charging.

After step S8, the operation returns to step S3, in which the above-mentioned processing is repeated.

If NO, that is, when the electromotive force VP is equal to or less than the first high electromotive force threshold VPH1 (VP VPH1), the operation proceeds to step S13, in which it is determined whether or not the electromotive force VP is smaller than the first low electromotive force threshold VPL1.

In the second modified embodiment, the VPL1 is −12 mV (VPL1=−12 mV) (see FIG. 6). This value (−12 mV) corresponds to a case where a lithium ion concentration SC of the stored electrolyte 130S has the first low concentration threshold SCL1 (=0.8 mol/L). Further, this value corresponds to a case where the internal resistance IR of the battery 101 is 4.0 mΩ (=first low resistance threshold IRL1) as illustrated in FIG. 8.

Thus, whether or not the concentration SC is smaller than the first low concentration threshold SCL1 can be estimated by determining whether or not the electromotive force VP is smaller than the first low electromotive force threshold VPL1 (see FIG. 9).

If NO, that is, when the electromotive force VP is equal to or more than the first low electromotive force threshold VPL1 (VP≥VPL1), the operation returns to step S3, and the above-mentioned processing is repeated.

In contrast, if YES, that is, when the electromotive force VP is equal to or less than the first low electromotive force threshold VPL1 (VP<VPL1), the operation proceeds to step S14, in which the charge and discharge control in the U1 mode is performed.

In the U1 mode, the substantially same control as that in the above-mentioned S mode is performed. The control in the U1 mode limits the upper limit charge current ICu in the charging of the battery pack 10 (the battery 101 and others) by the engine 50 of the vehicle 300 or upon braking of the vehicle 300, to a value which is by 20% lower than a value of the maximum charge current ICmax under the control in the S mode. That is, the HV controller 20 charges the battery pack 10 with the maximum charge current ICmax under the control in the S mode during charging or the like from the engine 50 or by a regeneration brake. However, even on such a charge control, the control in the U1 mode charges the battery 10 only with the upper limit charge current ICu (=0.8×ICmax, for example, 160 A).

In the second modified embodiment, the S mode and the U1 mode do not differ from each other in control of the discharging.

After the control in step S14, the operation returns to step S3, and the above-mentioned processing is repeated.

Then, the processing in step S15 will be described below. In step S15, it is determined whether or not the vehicle battery system SV3 performs the charge and discharge control in the T1 mode. If YES, that is, when the charge and discharge control in the T1 mode is performed, the operation proceeds to step S16. In contrast, if NO, that is, when the charge and discharge control in the above-mentioned U1 mode is performed, the operation proceeds to step S17.

In step S16, the HV controller 20 determines whether or not the measured electromotive force VP is smaller than a second high electromotive force threshold VPH2.

In the second modified embodiment, the VPH2 is, for example, 13 mV (VPH2=13 mV) (see FIG. 6). This value (13 mV) corresponds to a case where a lithium ion concentration SC of the stored electrolyte 130S has the second high concentration threshold SCH2 (=1.2 mol/L). Further, this value corresponds to a case where the internal resistance IR of the battery 101 has a second high resistance threshold IRH2 (=4.7 mΩ) as illustrated in FIG. 8. Thus, whether or not the concentration SC is larger than the second high concentration threshold SCH2 can be estimated by determining whether or not the electromotive force VP is larger than the second high electromotive force threshold VPH2 (see FIG. 12). Further, whether or not the internal resistance IR of the battery 101 is larger than the second high resistance threshold IRH2 at the concentration SC within a range of about 1.0 mol/L or more can be estimated by whether or not the concentration SC is larger than the second high concentration threshold SCH2 (see FIG. 12).

If YES, that is, when the electromotive force VP is smaller than the second high electromotive force threshold VPH2 (VP<VPH2), the operation returns to step S2, and the charge and discharge control in the S mode is performed. In contrast, if NO, that is, when the electromotive force VP is equal to or more than the second high electromotive force threshold VPH2 (VP≥VPH2), the operation returns to step S3, and the above-mentioned processing is repeated.

On the other hand, in step S17, it is determined whether or not the measured electromotive force VP is larger than a second low electromotive force threshold VPL2.

In the second modified embodiment, the VPL2 is, for example, −5 mV (VPL2=−5 mV) (see FIG. 6). This value (−5 mV) corresponds to a case where a lithium ion concentration SC of the stored electrolyte 130S has the second low concentration threshold SCL2 (=0.9 mol/L). Further, this value corresponds to a case where the internal resistance IR of the battery 101 is 3.8 mΩ (=the second low resistance threshold IRL2) as illustrated in FIG. 8. Thus, whether or not the concentration SC is smaller than the second low concentration threshold SCL2 can be estimated by determining whether or not the electromotive force VP is smaller than the second low electromotive force threshold VPL2 (see FIG. 9).

If YES, that is, when the electromotive force VP is larger than the second low electromotive force threshold VPL2 (VP>VPL2), the operation returns to step S2, and the charge and discharge control in the S mode is performed. If NO, that is, when the electromotive force VP is equal to or less than the second low electromotive force threshold VPL2 (VP≤VPL2), the operation returns to step S3, and the above-mentioned processing is repeated.

Thus, the second modified embodiment controls the electromotive force VP within a range of about −12 to 24 mV, the lithium ion concentration SC of the stored electrolyte 130S within a range of about 0.8 to 1.4 mol/L, and the internal resistance IR of the battery 101 within a range of about 3.8 to 7.0 mΩ.

As mentioned above, the vehicle battery system SV3 in the vehicle 300 of the second modified embodiment includes the battery 101, the concentration difference electromotive force measurement means M1, and the charge and discharge control means (HV controller 20) having the control means S2 in the S mode, the control means S8 in the T1 mode, the control means S14 in the U1 mode, and the mode selecting means S11, S13, S15, and S17. The vehicle electronic system SV3 decreases the discharge current flowing on a predetermined discharge condition (for example, during discharging upon sudden acceleration, or sudden starting) in the case of charging and discharging by the control means S8 in the T1 mode, as compared to the case of the control means S2 in the S mode. On other discharge conditions, the discharge currents in the modes are made equal. Thus, the charge and discharge control in the T1 mode can gradually decrease the internal resistance IR of the battery 101 and others. Together with this, the electromotive force VP and the concentration SC can be gradually decreased.

On the other hand, in the case of charging and discharging by the control means S14 in the U1 mode, the charge current flowing on a predetermined charge condition (for example, during charging by the engine or during charging by the regeneration brake) is decreased as compared to the case of charging and discharging by the control means S2 in the S mode. On other charge conditions, the charge currents in the modes are made equal. Thus, the charge and discharge control in the U1 mode can gradually increase the internal resistance IR of the battery 101 and others. Together with this, the electromotive force VP and the concentration SC can be gradually increased.

Thus, also in the second modified embodiment, when the electromotive force VP measured by the concentration difference electromotive force measurement means M1 is detected to be higher than the first high electromotive force threshold VPH1 (when the concentration SC is larger than the first high concentration threshold SCH1, and the internal resistance IR is higher than the first high resistance threshold IRH1), the charging and discharging is controlled by switching to the charge and discharge control by the control means S8 in the T1 mode. This can decrease the internal resistance IR of the batteries 101 and 102, and restore the degradation of the battery 101 and others.

Conversely, when the electromotive force VP is detected to be lower than the first low electromotive force threshold VPL1 (when the concentration SC is smaller than the first low concentration threshold SCL1), the charge and discharge control is switched to the U1 mode using the control means 514. This can prevent the internal resistance IR of the battery 101 and others from being excessively decreased. Alternatively, the continuous control in the mode for decreasing the internal resistance T1 can prevent the internal resistance IR from rather increasing.

Accordingly, the internal resistance IR of the battery 101 and others can be prevented from being continuously increased and degraded, and thus can be constantly restrained within the appropriate range.

The vehicle battery system SV3 limits the discharge condition in the T1 mode, and also limits the charge condition in the U1 mode, as compared to the S mode. Specifically, during discharging under the control of the control means S8 in the T1 mode, the discharge current (an upper limit discharge current IDu) smaller than the maximum discharge current IDmax is allowed to flow through the system. In contrast, during charging under the control of the control means S14 in the U1 mode, the charge current (an upper limit charge current ICu) smaller than the maximum charge current ICmax is allowed to flow through the system. In this way, the two mode control means S8 and S14 whose changing tendencies of the internal resistances IRs are reverse to each other can be easily achieved.

In the second modified embodiment, the vehicle battery system SV3 corresponds to the battery system. The concentration difference electromotive force measurement means M1 corresponds to the internal resistance detecting means, the resistance correlation physical quantity detecting means, and the stored electrolyte concentration detecting means. The control means S8 in the T1 mode corresponds to the decreasing mode control means, the second mode control means, or the fourth mode control means. The control means S14 in the U1 mode corresponds to the increasing mode control means, the first mode control means, or third mode control means. Further, the control means S2 in the S mode corresponds to fifth mode control means; the control means S8 in the T1 mode to sixth mode control means; and the control means S14 in the U1 mode to seventh mode control means.

In the second modified embodiment, switching between the S mode and T1 mode uses two thresholds (VPH1 and VPH2) to set the first high electromotive force threshold VPH1 to 24 mV, and the second high electromotive force threshold VPH2 to 13 mV apart from the above value. However, switching between the S mode and the T1 mode can also be performed using one first electromotive force threshold VPT1 (for example, VPT1=13 mV (which corresponds to a first concentration threshold SCT1=1.2 mol/L, and a first resistance threshold IRT1=4.7 mΩ)) for the electromotive force VP (see FIG. 12).

Further, switching between the S mode and the U1 mode uses two thresholds (VPL1, and VPL2) to set the first low electromotive force threshold VPL1 to −12 mV, and the second low electromotive force threshold VPL2 to −5 mV apart from the above value. However, switching between the S mode and the U1 mode can also be performed using one second electromotive force threshold VPT2 (for example, VPT2=−5 mV (which corresponds to a second concentration threshold SCT2=0.9 mol/L, and a second resistance threshold IRT2=3.8 mΩ)) for the electromotive force VP (see FIG. 12).

In such cases, the second modified embodiment controls the electromotive force Vp within a range of about −5 to 13 mV, the lithium ion concentration SC of the stored electrolyte 130S within a range of about 0.9 to 1.2 mol/L, and the internal resistance IR of the battery 101 within a range of about 3.8 to 7.0 mΩ.

Third Modified Embodiment

Next, a vehicle according to a third modified embodiment of the invention will be described below with reference to FIGS. 1 and 13.

A vehicle 400 of the third modified embodiment has the same structure as that of the above-mentioned second modified embodiment except for contents regarding the charge and discharge control of the vehicle battery system. Specifically, in the T1 mode of the second modified embodiment, an upper limit discharge current IDu is provided which is by 20% lower than a value of the maximum discharge current IDmax in the S mode, for performing control of limiting the discharge current from the battery pack. However, in the third modified embodiment, a value of the discharge current of the battery pack is controlled to be equally limited as a whole. Further, in the above-mentioned modified embodiment, in the U1 mode, an upper limit charge current ICu is provided which is by 20% lower than a value of the maximum charge current ICmax in the S mode, for performing control of limiting the charge current into the battery pack. However, in the third modified embodiment, a value of charge current of the battery pack is also controlled to be equally limited.

Accordingly, the following explanation is focused on the differences, and similar or identical parts to those in the second modified embodiment are not explained or briefly described. It is to be noted that the similar or identical parts provide the same operations and advantages as those in the second modified embodiment. The same contents are explained with the same reference signs.

The vehicle 400 of the third modified embodiment includes a vehicle battery system SV4 which controls the charging and discharging of the battery 101 and others thereby to suppress an increase in internal resistance IR of the battery 101 or to reduce and restore the internal resistance IR, thus restraining the internal resistance IR within an appropriate range (see FIG. 1). The vehicle battery system SV4 includes the above-mentioned battery pack 10, the HV controller 20, the front motor 30, the rear motor 40, the engine 50, the cable 60, and the inverter 70, like the first embodiment and the second modified embodiment. The charge and discharge control of the battery pack 10 by the vehicle battery system SV4 differs from the vehicle battery system SV3 of the second modified embodiment.

Figure 12:
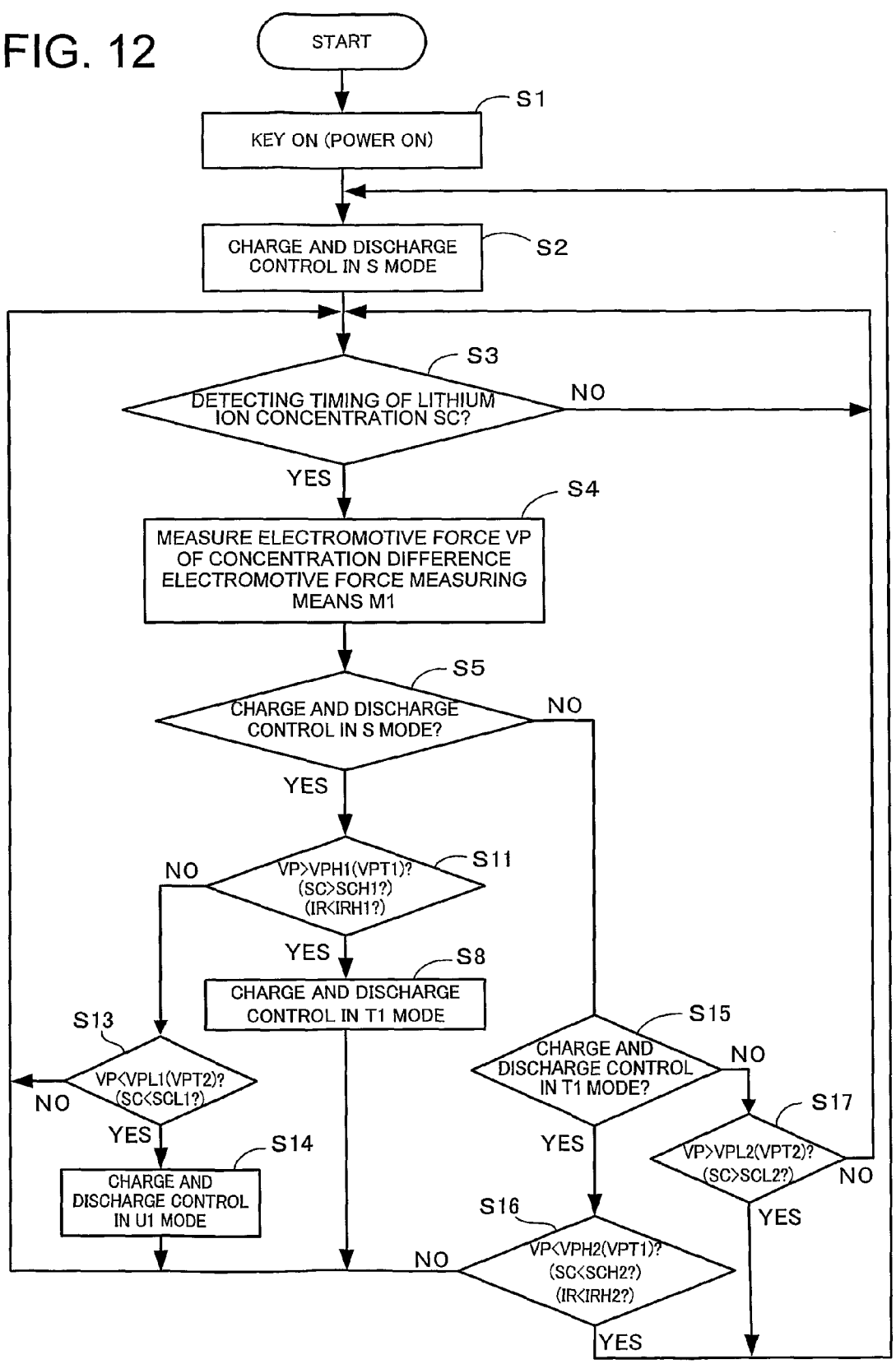
FIG. 12 is a flowchart of a battery system in the second modified embodiment.
Figure 13:
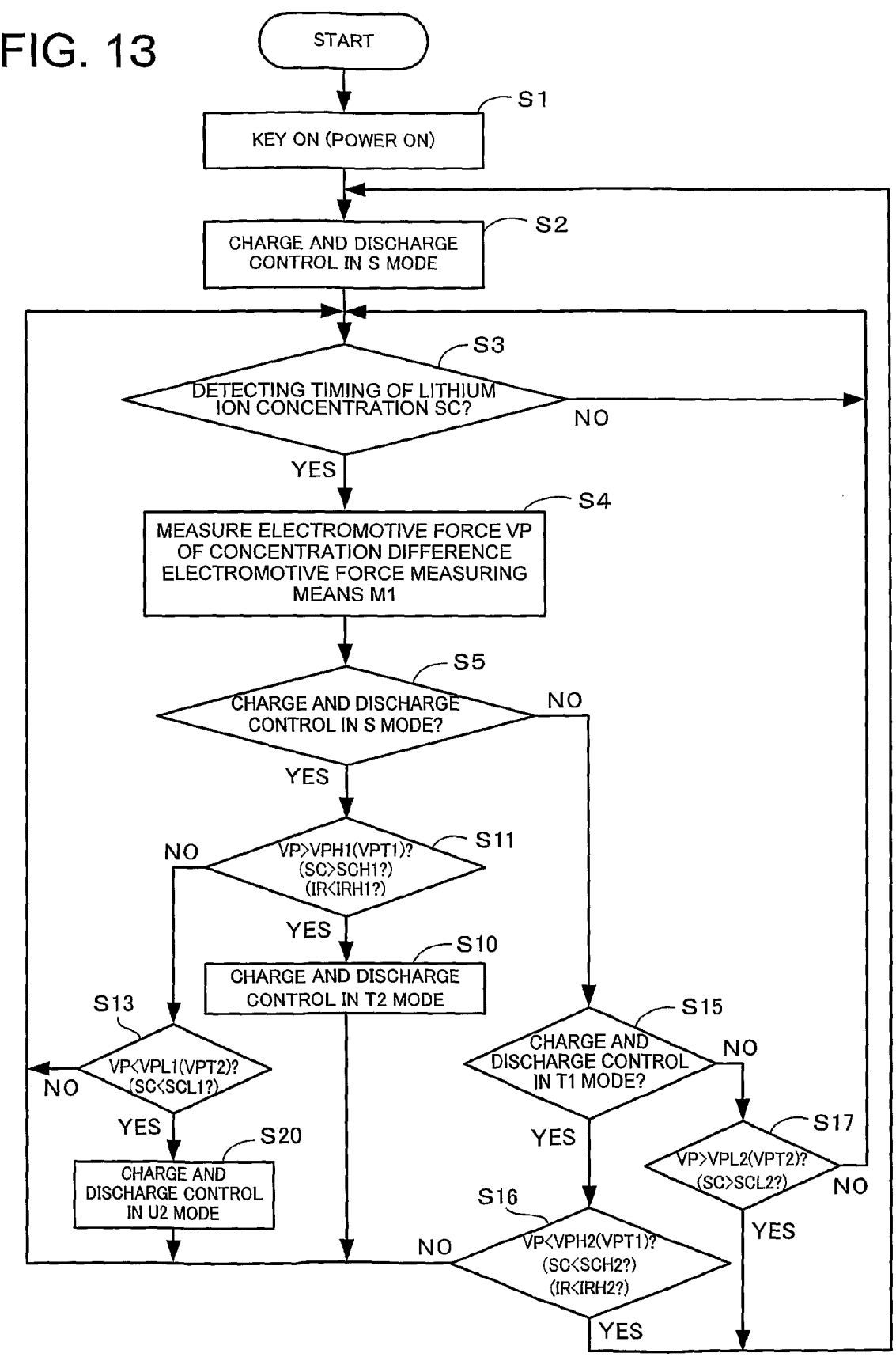
FIG. 13 is a flowchart of a battery system in the third modified embodiment.

Specifically, the third modified embodiment differs from the above-mentioned second modified embodiment shown in FIG. 12 in that step S10 is used in place of step S8, and that step S20 is used in place of step S14 among the respective steps shown in the flowchart of FIG. 13. Among the steps, step S10 is the control in T2 mode explained in the first modified embodiment, and has already been described. Thus, a description thereof will be omitted below. Reference will now be made to step S20.

In step S20, the charge and discharge control of the battery pack 10 in U2 mode is performed. In the U2 mode, almost the same control as that in the above-mentioned S mode is performed. The control in the U2 mode makes the charge current for charging the battery 10 by 20% lower than that of the charge current under the control in the S mode. That is, the HV controller 20 charges the battery pack 10 with the charge current whose value is equally decreased by 20% under the control in the U2 mode as compared to the magnitude of the charge current for charging the battery under the control in the S mode.

In the third modified embodiment, the S mode and the U2 mode do not differ from each other in control of the discharging.

The vehicle battery system SV4 in the vehicle 400 of the third modified embodiment makes the discharge current by control of the control means S10 in the T2 mode smaller than that by the control means S2 in the S mode even on any of the discharge conditions. Such control means S10 in the T2 mode can be used to repeatedly perform the charging and discharging to ensure a gradual decrease in internal resistance IR of the battery 101 and others, thereby restoring the degradation of the battery 101 and others.

On the other hand, the vehicle battery system SV4 makes the charge current by the control means S20 in the U2 mode small on any one of the charge conditions, as compared to the case of the control means S2 in the S mode. Such control means S2 in the U2 mode can be used to repeat the charging and discharging, thereby increasing the internal resistance IR of the battery 101 and others.

Thus, two mode control means S10 and S20 in which changing tendencies of the respective internal resistances IRs are reverse to each other can be easily achieved.

Fourth Modified Embodiment

Next, a vehicle according to a fourth modified embodiment of the invention will be described below with reference to FIGS. 1, 2, and 14 to 17.

Figure 14:
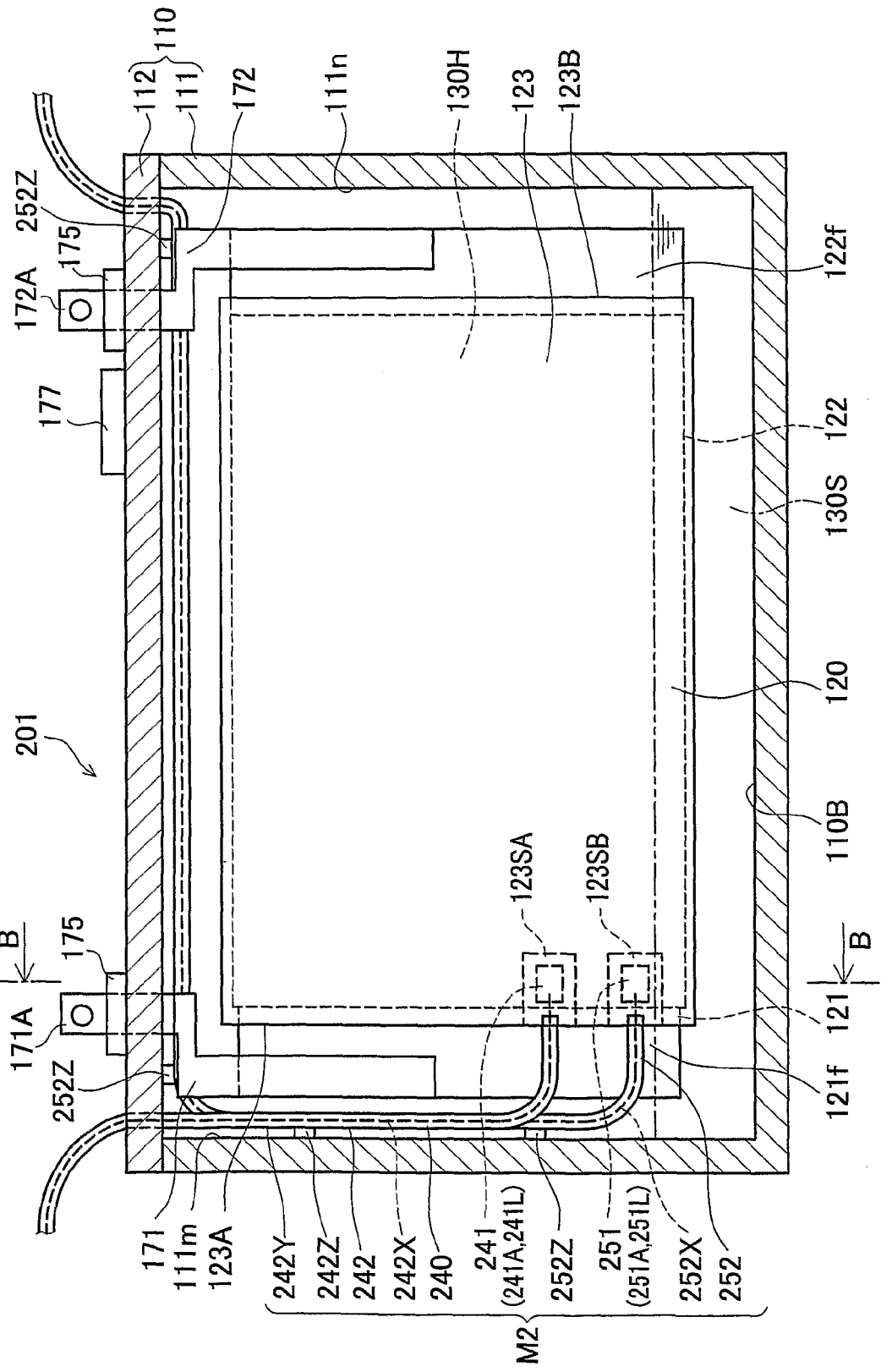
FIG. 14 is a partial sectional view of a battery in a battery system in the fourth modified embodiment.

A vehicle 500 of the fourth modified embodiment has the same structure as that of the above-mentioned first embodiment except that the battery pack 10 mounted thereon includes a battery 201 having retained electrolyte concentration detecting means M2 in place of the battery 101 as shown in FIG. 14.

Accordingly, the following explanation is focused on the differences, and similar or identical parts to those in the first embodiment are not explained or briefly described. It is to be noted that the similar or identical parts provide the same operations and advantages as those in the first embodiment. The same contents are explained with the same reference signs.

Also, the vehicle 500 of the fourth modified embodiment is a hybrid electric vehicle driven by the HV controller 20 using the engine 50, the front motor 30, and the rear motor 40, like the first embodiment. The vehicle 500 also includes the vehicle body 90, the cable 60, the inverter 70, and the battery pack 10 in addition to the aforesaid components.

The battery pack 10 includes the battery part 11 and the battery monitoring device 12, like the first embodiment shown in FIG. 2.

The battery part 11 of this embodiment differs from the first embodiment in that the battery part 11 includes a wound-type battery 201 having retained electrolyte concentration detecting means M2 in addition to the rectangular box-shaped battery case 110, the power generating element 120, and the electrolyte 130, and another battery 102 not having the retained electrolyte concentration detecting means M2.

Now, the battery 201 including the retained electrolyte concentration detecting means M2 will be described below with reference to FIGS. 14 to 16.

As shown in FIG. 14, the retained electrolyte concentration detecting means M2 of the battery 201 includes a first electrode main part 241 in contact with a retained electrolyte 130H retained between the positive electrode plate 121 and the negative electrode plate 122 of the power generating element 120, and a second electrode main part 251 apart from the first electrode main part 241 and likewise in contact with the retained electrolyte 130H.

A first measurement electrode 240 includes the first electrode main part 241 described above and a first lead wire 242. The first electrode main part 241 carries a first metal plate 241L on both sides of a carrier 241A. The first lead wire 242 includes a nickel wire 242X electrically connected to the electrode body 241, and covered with a coating member 242Y made of insulating resin. Similarly, a second measurement electrode 250 includes the second electrode main part 251 described above and a second lead wire 252. The second electrode main part 251 carries a second metal plate 251L on both sides of a carrier 251A. The second lead wire 252 includes a nickel wire 252X electrically connected to the electrode body 251, and covered with a coating member 252Y made of insulating resin.

Figure 15:
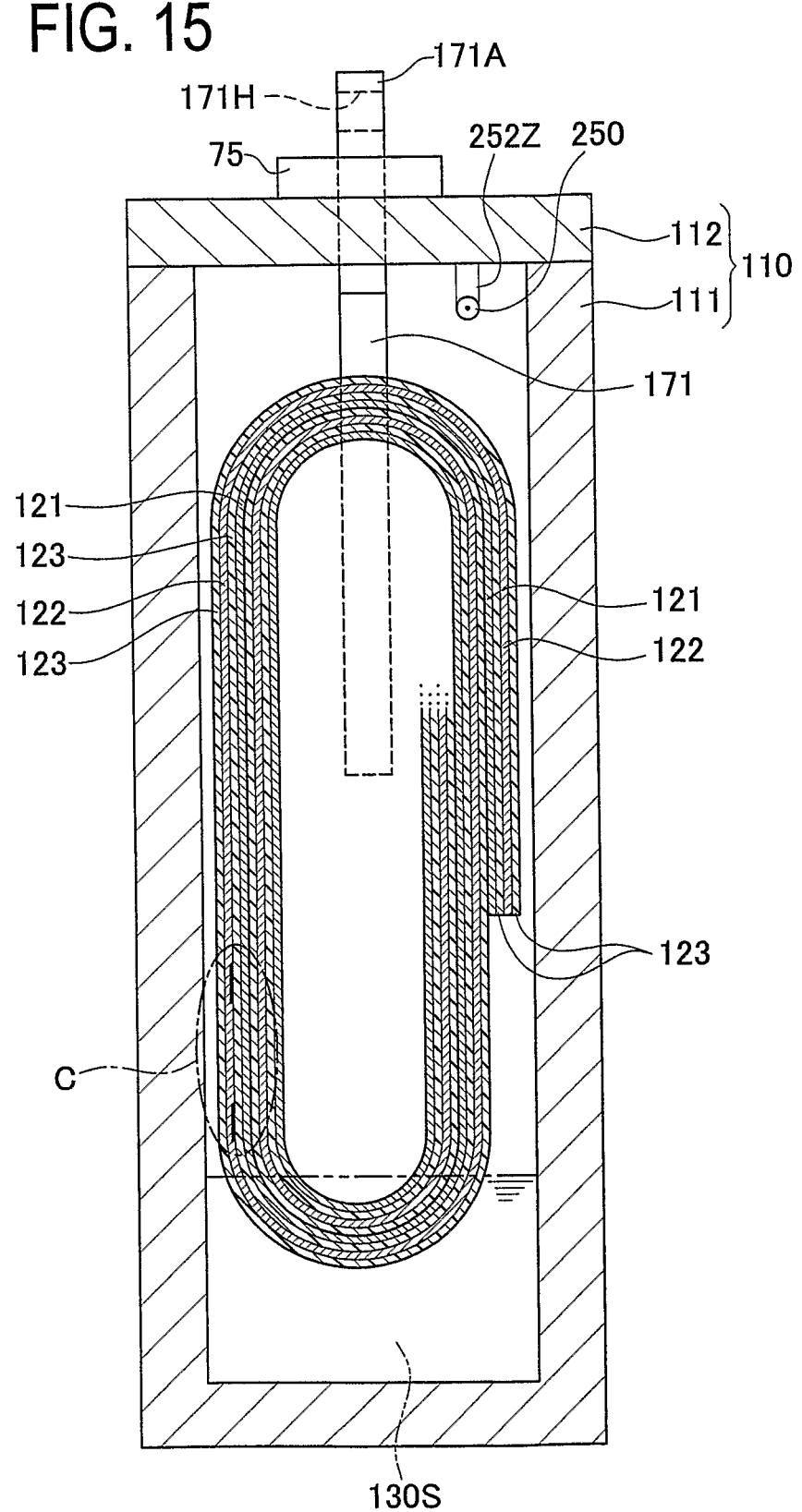
FIG. 15 is a sectional view (along a line B-B) of the battery in the battery system in the fourth embodiment.
Figure 16:
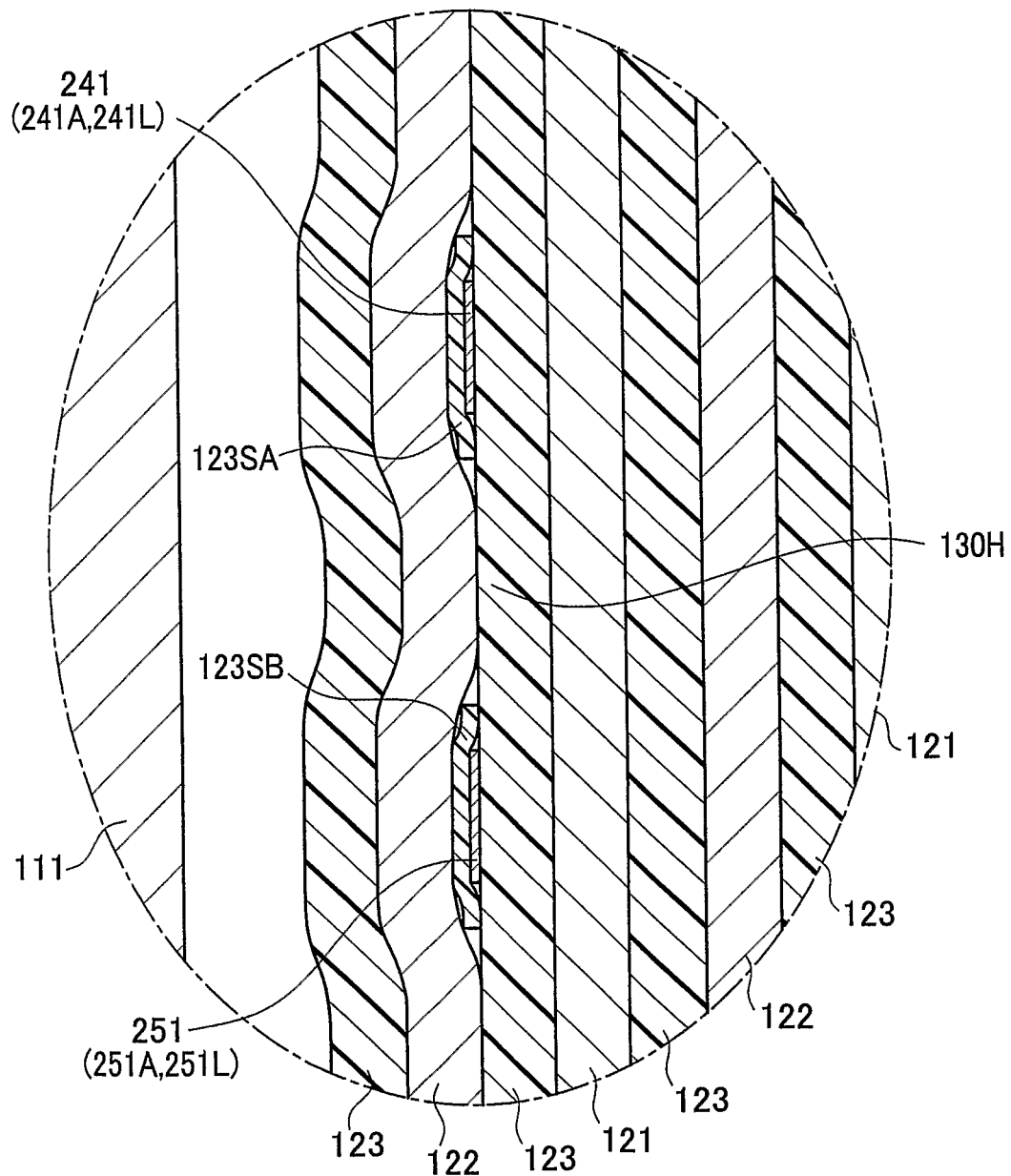
FIG. 16 is a partial enlarged sectional view (an area C) of the battery in the battery system in the fourth embodiment.

The first electrode main part 241 and the second electrode main part 251 are respectively inserted from a first end 123A of a separator 123 intervening in between the positive electrode plate 121 and the negative electrode plate 122 toward the center of the power generating element 120 to be arranged spaced apart from each other on one side of the separator 123 (see FIGS. 14, 15, and 16). The first electrode main part 241 and the second electrode main part 251 are in contact with the retained electrolyte 130H retained by the separator 123 (see FIGS. 15 and 16).

A first insulating film 123SA and a second insulating film 123SB made of the same polyethylene as that of the separator 123 intervene in between the first and second electrode bodies 241 and 251 and the positive electrode plate 121 (or the negative electrode plate 122) so as to cover the first electrode main part 241 and the second electrode main part 251. Thus, the first electrode main part 241 and the second electrode main part 251 are insulated from the negative electrode plate 122 (see FIGS. 15 and 16). The first lead wire 242 and the second lead wire 252 extending from the power generating element 120 are respectively fixed to the first side 111m of the case body 111 and the closing lid 112 via a plurality of fixing members 242Z and 252Z made of resin (see FIG. 14).

Thus, the battery 201 of the fourth modified embodiment includes the first electrode main part 241 and the second electrode main part 251 in contact with the retained electrolyte 130H. Application of a certain voltage to between the first and second electrode bodies 241 and 251 allows current to flow through the retained electrolyte 130H. The magnitude of resistance caused between the electrode bodies 241 and 251 changes according to the lithium ion concentration HC of the retained electrolyte 130H. Thus, the retained electrolyte concentration detecting means M2 can be used to determine the lithium ion concentration HC of the retained electrolyte 130H from the magnitude of the concentration detection current HI flowing in application of the certain voltage to between the first and second electrode bodies 241 and 251. A positive correlation exists between the lithium ion concentration HC of the retained electrolyte 130H and the concentration detection current HI measured by the retained electrolyte concentration detecting means M2. That is, the higher the concentration HC, the larger the concentration detection current HI. On the other hand, the lithium ion concentration HC of the retained electrolyte 130H has a negative correlation with the internal resistance IR of the battery 201 as mentioned above. As the internal resistance IR of the battery 201 increases, the concentration HC becomes low. Thus, when the internal resistance IR of the battery 201 is high, the concentration HC of the retained electrolyte 130H becomes low, and the concentration detection current HI of the retained electrolyte concentration detecting means M2 also becomes small. Conversely, when the internal resistance IR of the battery 201 is low, the concentration HC becomes high, and the concentration detection current HI also becomes large. Accordingly, the level of the internal resistance IR can be estimated from the lithium ion concentration HC of the retained electrolyte 130H estimated by use of the concentration detection current HI.

The vehicle 500 of the fourth modified embodiment provides a vehicle battery system SV5 which controls the charging and discharging of the batteries 201 and 102 to suppress the increase in internal resistance IR of the battery 201 and others, or to reduce and restore the internal resistance IR, thereby restraining the internal resistance IR within the appropriate range. The vehicle battery system SV5 includes the above-mentioned battery pack 10, the HV controller 20, the front motor 30, the rear motor 40, the engine 50, the cable 60, and the inverter 70, like the first embodiment.

Now, the control of the vehicle battery system SV5 will be described below with reference to the flowchart shown in FIG. 17.

Figure 17:
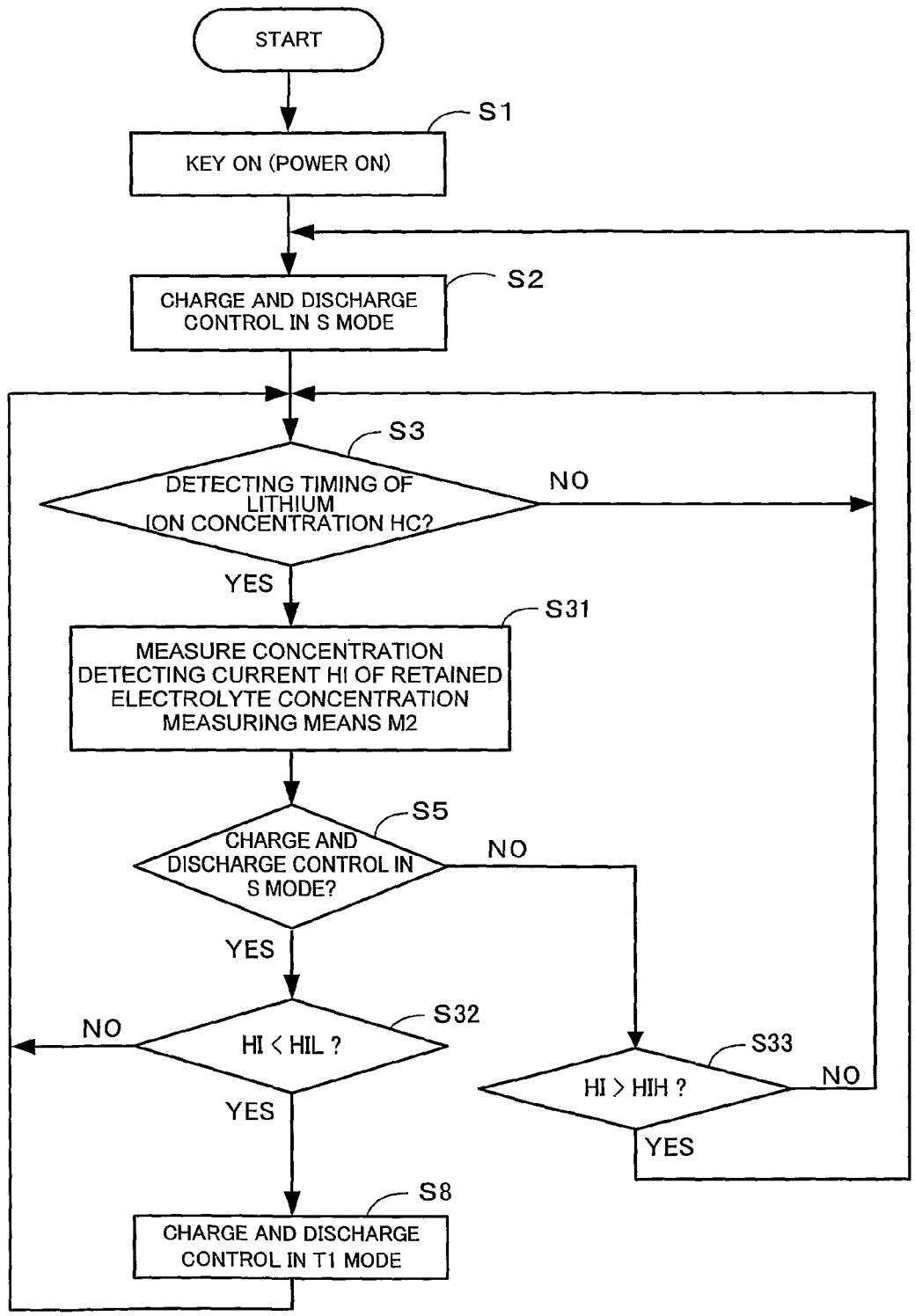
FIG. 17 is a flowchart of the battery in the battery system in the fourth embodiment.

Steps S1 to S3, step S5 and step S8 among the steps shown in FIG. 17 are the same as those in the first embodiment, and a detailed description of steps S1 to S3 and S8 will be omitted below. In step S3, the HV controller 20 determines whether the timing for detecting the lithium ion concentration HC of the retained electrolyte 130H of the battery 201 has come or not. If NO, that is, when the timing for detecting the lithium ion concentration HC has not come, the operation returns to step S3.

If YES, that is, when the timing for detecting the lithium ion concentration HC has come, the operation proceeds to step S31, in which the retained electrolyte concentration detecting means M2 of the battery 201 is used to measure the concentration detection current HI flowing through between the first and second electrode bodies 241 and 251.

After measuring the concentration detection current HI in step S31, it is determined whether or not the vehicle battery system SV5 performs the charge and discharge control in the S mode (step S5). If YES, that is, when the charge and discharge control in the S mode is performed, the operation proceeds to step S32. In contrast, if NO, that is, when the charge and discharge control in the T1 mode is performed, the operation proceeds to step S33.

In step S32, the HV controller 20 determines whether or not the measured concentration detection current HI is smaller than the low current threshold HIL.

If NO, that is, when the concentration detection current HI is equal to or more than the low current threshold HIL (HI≥HIL), the operation returns to step S3, and the above-mentioned processing is repeated.

If YES, that is, when the concentration detection current HI is smaller than the low current threshold HIL (HI<HIL), the operation proceeds to step S8, in which the charge and discharge control in the T1 mode is performed for the battery pack 10 (batteries 201 and 102).

In step S33, the HV controller 20 determines whether or not the measured concentration detection current HI is larger than the high current threshold HIH. The high current threshold HIH is larger than the low current threshold HIL.

If NO, that is, when the concentration detection current HI is equal to or less than the high current threshold HIH (HI≤HIH), the operation returns to step S3, and the above-mentioned processing is repeated.

In contrast, if YES, that is, when the concentration detection current HI is larger than the high current threshold HIH (HI>HIH), the operation returns to step S2, and then the charge and discharge control in the S mode is performed again.

Thus, the vehicle battery system SV5 of the fourth modified embodiment includes the retained electrolyte concentration detecting means M2, the control means S2 in the S mode, the control means S8 in the T1 mode, and the mode selecting means S32 and S33. For example, when the charging and discharging of the battery pack 10 (the battery 201 and others) is controlled by the control means S2 in the S mode thereby to gradually increase the internal resistance IR of the battery 201, thus making the internal resistance IR relatively high, that is, when the concentration detection current HI is smaller than the low current threshold HIL, the charge and discharge control is switched to that by the control means S8 in the T1 mode. Accordingly, the internal resistance IR can be decreased to restore the degradation of the battery 201. Together with this, the concentration detection current HI and the concentration HC can be gradually increased.

Conversely, when the charging and discharging of the battery pack 10 is controlled by the control means S8 in the T1 mode thereby to gradually decrease the internal resistance IR of the battery 201, thus making the internal resistance IR relatively low, that is, when the concentration detection current HI is larger than the high current threshold HIH, the charge and discharge control is switched to that by the control means S2 in the S mode, thereby preventing the internal resistance IR from excessively decreasing, or, thereby preventing the internal resistance IR from rather increasing due to continuous control by the control means in the T1 mode for decreasing the internal resistance IR. Accordingly, the concentration detection current HI and the concentration HC can also be gradually decreased.

Thus, in the fourth modified embodiment, the concentration detection current HI is controlled substantially between two thresholds HIL and HIH, and the lithium ion concentration HC of the retained electrolyte 130H and the internal resistance IR of the battery 201 are controlled within respective ranges corresponding thereto.

This can prevent the degradation of the battery 201 and others due to the continuous increase in internal resistance IR of the batteries 201 and 102, and constantly restrain the internal resistance IR within the appropriate range.

In the fourth modified embodiment, the retained electrolyte concentration detecting means M2 measures the concentration detection current HI thereby to estimate the concentration HC of the retained electrolyte 130H and the internal resistance IR of the battery 201. However, the resistance caused between the first electrode main part 241 and the second electrode main part 251 may be measured thereby to estimate the concentration HC of the retained electrolyte 130H and the internal resistance IR of the battery 201.

Second Embodiment

A notebook-size personal computer 900 (hereinafter referred to as a "notebook computer") according to the second embodiment of the invention will be described below with reference to FIGS. 10 and 18.

The notebook computer 900 is a battery mounted device including a CPU 920, a memory (not shown), a battery pack 910, and a body 990. The battery pack 910 includes a battery 101 having concentration difference electromotive force measurement means M1 and connected in series, in addition to a plurality of batteries 102 each having no function of measuring concentration of the electrolyte 130, and a battery monitoring device 912. A PC battery system SP1 of the second embodiment includes the CPU 920, the memory (not shown), the battery pack 910, and the battery monitoring device 912.

The CPU 920 communicates with the battery pack 910 including a circuit (not shown) and a communication cable 912B, reads a program prepared in the memory therefrom, and processes the program at high speed. For example, the CPU 920 executes a charge and discharge control program for the battery pack 910.

The battery monitoring device 912 includes an obtaining circuit (not shown) for obtaining data regarding states (battery temperature and voltage) of the batteries 101 and 102 of the battery pack 910 using a sensor, such as a thermistor (not shown), and an electromotive force obtaining circuit 912A1 in battery monitoring device body 912A (see FIG. 10).

FIG. 10 selectively illustrates the CPU 920, the battery monitoring device 912, and the battery 101 in the above-mentioned PC battery system SP1. The battery monitoring device 912 including the electromotive force obtaining circuit 912A1 is connected to and communicates with the CPU 920 via the communication cable 912B as mentioned above, while being connected to the concentration difference electromotive force measurement means M1 of the battery 101. Thus, the electromotive force obtaining circuit 912A1 can obtain the electromotive force VP between the first and second measurement electrodes 140 and 150. The obtained electromotive force VP is sent to the CPU 920 through the communication cable 912B together with other data about the battery.

The CPU 920 of the PC battery system SP1 can determine a state of degradation of the battery 101 based on battery data received from the electromotive force obtaining circuit 912A1. The control mode of the batteries 101 and 102 inside the battery pack 910 is changed according to the determination.

For example, the control of the PC battery system SP1 will be performed according to the flowchart shown in FIG. 9.

First, when a power source of the notebook computer 900 is turned ON (step S1), the CPU 920 is started up to operate according to a program for controlling the PC battery system SP1. Then, the charge and discharge control in the S mode is selected for the battery pack 910 (step S2). In the charge and discharge control in the S mode, in order to supply power required for the circuit and devices in the notebook computer 900 (for example, the CPU 920, an HDD not shown, a cooling fan, and a monitor), the current corresponding to the power is discharged from the battery pack 910, or the battery pack 910 is charged with the power supplied from an external power source (not shown).

The CPU 920 sets the maximum discharge current IDmax and the max charge current ICmax of the battery 101 and others under the charge and discharge control in the S mode.

The CPU 920 has itself a timer (not shown), and determines, for example, every 10 days, whether or not the timing for detecting the lithium ion concentration SC of the stored electrolyte 130S of the battery 101 has come in step S3. If NO, that is, when the timing for detecting the lithium ion concentration SC has not come, the operation returns to step S3. In contrast, if YES in step S3, that is, when the timing for detecting the lithium ion concentration SC has come, the operation proceeds to step S4, in which the electromotive force VP caused between the first and second electrode bodies 141 and 151 is measured using the concentration difference electromotive force measurement means M1 of the battery 101.

In step S4, the electromotive force VP is measured by the above-mentioned concentration difference electromotive force measurement means M1. After measuring the electromotive force VP, it is determined whether or not the PC battery system SP1 controls the charging and discharging in the S mode (step S5). If YES, the operation proceeds to step S6. On the other hand, if NO, that is, when the charge and discharge control in the T1 mode is performed, the operation proceeds to step S7.

In step S6, the CPU 920 receives the measured electromotive force VP through the electromotive force obtaining circuit 912A1, and determines whether or not the electromotive force VP is larger than the high electromotive force threshold VPH.

If NO, that is, when the electromotive force VP is equal to or less than the high electromotive force threshold VPH (VP≤VPH), the operation returns to step S3, and the above-mentioned processing is repeated.

If YES, that is, when the electromotive force VP is larger than the high electromotive force threshold VPH (VP>VPH), the operation proceeds to step S8, in which the charge and discharge control in the T1 mode is performed for the battery pack 10. In the T1 mode, the same control processing as that in the above-mentioned S mode is performed. Under the control in the T1 mode, the upper limit discharge current IDu to be discharged from the battery pack 910 is set to a value by 20% lower than a value of the maximum discharge current IDmax under the control in the S mode (IDu=0.8×IDmax). That is, the CPU 920 discharges the maximum discharge current IDmax under the control in the S mode. In such a condition under the control in the T1 mode, the CPU 920 only discharges the upper limit discharge current IDu that is decreased by 20% as compared to the maximum discharge current IDmax.

In the second embodiment, as to the charging, the S mode and the T1 mode do not differ from each other in control of the charging.

As can be seen from the findings, when the charge and discharge control of the battery pack 910 in the T1 mode continues over a long time to some degree (for example, for three or more months), the lithium ion concentration SC of the stored electrolyte 130S is gradually decreased during the time as compared to the case of the charge and discharge control in the S mode. Conversely, the lithium ion concentration HC of the retained electrolyte 130H is gradually increased. This can prevent and rather reduce the increase in internal resistance IR of the batteries 101 and 102 in the battery pack 910.

On the other hand, in step S7, the CPU 920 determines whether or not the measured electromotive force VP is smaller than the low electromotive force threshold VPL.

If NO, that is, when the electromotive force VP is equal to or more than the low electromotive force threshold VPL (VP≥VPL), the operation returns to step S3, and the above-mentioned processing is repeated.

If YES, that is, when the electromotive force VP is smaller than the low electromotive force threshold VPL (VP<VPL), the operation returns to step S2, in which the charge and discharge control in the S mode is performed.

The notebook computer 900 according to the second embodiment is equipped with the above-mentioned PC battery system SP1 and can select any one of the control means S2 in the S mode and the control means S8 in the T1 mode by use of the electromotive force VP that has a correlation with the lithium ion concentration SC of the stored electrolyte 130S and is estimated by the concentration difference electromotive force measurement means M1. This can surely suppress the increase in internal resistance IR of the mounted batteries 101 and 102 or surely decrease and restore the internal resistance IR, thereby restraining the internal resistance IR within the appropriate range.

Although the invention has been described using the first and second embodiments and the first to fourth modified embodiments, the invention is not limited to the embodiments disclosed herein. It will be apparent that various modifications can be made to the invention without departing from the scope of the invention.

Although in the above-mentioned embodiments, the wound-type lithium ion secondary battery is used as the battery, the invention may be applied to a lamination type lithium ion secondary battery including positive electrode plates and negative electrode plates laminated so that separators are interposed therebetween. In order to detect the lithium ion concentration HC of the retained electrolyte 130H or a lithium ion concentration SC of the stored electrolyte 130S, the electromotive force VP or the concentration detection current HI between the first measurement electrode 140 and the second measurement electrode 150 of the battery 101 or between the first measurement electrode 240 and the second measurement electrode 250 of the battery 201 is measured. However, for example, the magnitude of voltage between the first and second measurement electrodes corresponding to the lithium ion concentrations SC and HC of the electrolytes 130S and 130H may be measured, for example, by allowing the constant current to flow through between the first and second measurement electrodes. Alternatively, the magnitude of current flowing between the first and second measurement electrodes may be measured by applying the constant voltage therebetween.

In the first embodiment, the filter 180 made of a porous glass plate is used as a partition member. However, the filter can be made of any other member which prevents the movement of ions due to the difference in concentration between the stored electrolyte and the reference electrolyte in a gap between first and second surfaces of the partition member, and which can measure a potential between the stored electrolyte 130S and the reference electrolyte 160 by the first and second measurement electrodes 140 and 150. For example, the filter can be made of ceramic or resin having such properties.

The invention claimed is:

1. A battery system comprising:
one or more lithium ion secondary batteries each having a power generating element and an electrolyte being impregnated in the power generating element and containing lithium ions;
charge and discharge control means for controlling charging and discharging of each of the lithium ion secondary batteries; and
internal resistance detecting means for performing at least one of detection and estimation about a level of internal resistance in at least one of the lithium ion secondary batteries;
wherein the charge and discharge control means comprises:
a plurality of mode control means for controlling charging and discharging each of the lithium ion secondary batteries on a predetermined charge and discharge condition, the mode control means including:
increasing mode control means for controlling charging and discharging each of the lithium ion secondary batteries on an increasing charge and discharge condition, the increasing mode control means being configured to increase the internal resistance of each of the lithium ion secondary batteries by continuously repeatedly performing charging and discharging by charge and discharge control; and
decreasing mode control means for controlling charging and discharging each of the lithium ion secondary batteries on a decreasing charge and discharge condition different from the increasing charge and discharge condition, the decreasing mode control means being configured to decrease the internal resistance of each of the lithium ion secondary batteries by continuously repeatedly performing charging and discharging by charge and discharge control;
mode selecting means for selecting one mode control means to be used from the plurality of mode control means,
wherein the mode selecting means is configured:
to select the decreasing mode control means when the internal resistance detecting means detects or estimates that the internal resistance is relatively high; and
to select the increasing mode control means when the internal resistance detecting means detects or estimates that the internal resistance is relatively low, and
wherein the internal resistance detecting means is resistance correlation physical quantity detecting means for estimating a level of the internal resistance based on a resistance correlation physical quality having a correlation with the internal resistance.

2. A battery system comprising:
one or more lithium ion secondary batteries each having a power generating element and an electrolyte being impregnated in the power generating element and containing lithium ions;
charge and discharge control means for controlling charging and discharging of each of the lithium ion secondary batteries; and
internal resistance detecting means for performing at least one of detection and estimation about a level of internal resistance in at least one of the lithium ion secondary batteries;
wherein the charge and discharge control means comprises:
a plurality of mode control means for controlling charging and discharging each of the lithium ion secondary batteries on a predetermined charge and discharge condition, the mode control means including:
first mode control means for controlling charging and discharging each of the lithium ion secondary batteries on a first charge and discharge condition; and
second mode control means for controlling charging and discharging each of the lithium ion secondary batteries on a second charge and discharge condition different from the first charge and discharge condition;
mode selecting means for selecting one mode control means to be used from the plurality of mode control means,
wherein
when a comparison is made between a case of discharging each of the lithium ion secondary batteries by the first mode control means and a case of discharging each of the lithium ion secondary batteries by the second mode control means,
a discharge current by the second mode control means is made smaller on a predetermined discharge condition and equal to or smaller on other discharge conditions than a discharge current by the first mode control means, and
the mode selecting means is configured:
to select the second mode control means when the internal resistance detecting means detects or estimates that the internal resistance is relatively high; and
to select the first mode control means when the internal resistance detecting means detects or estimates that the internal resistance is relatively low.

3. The battery system according to claim 2, wherein
the predetermined discharge condition is a discharge condition where a maximum discharge current available by the first mode control means flows.

4. The battery system according to claim 2, wherein
on any one of the predetermined discharge condition and said other discharge conditions,
a discharge current by the second mode control means is made smaller than a discharge current by the first mode control means.

5. A battery system comprising:
one or more lithium ion secondary batteries each having a power generating element and an electrolyte being impregnated in the power generating element and containing lithium ions;
charge and discharge control means for controlling charging and discharging of each of the lithium ion secondary batteries; and
internal resistance detecting means for performing at least one of detection and estimation about a level of internal resistance in at least one of the lithium ion secondary batteries;
wherein the charge and discharge control means comprises:
a plurality of mode control means for controlling charging and discharging each of the lithium ion secondary batteries on a predetermined charge and discharge condition, the mode control means including:
first mode control means for controlling charging and discharging each of the lithium ion secondary batteries on a first charge and discharge condition; and
second mode control means for controlling charging and discharging each of the lithium ion secondary batteries on a second charge and discharge condition different from the first charge and discharge condition;

mode selecting means for selecting one mode control means to be used from the plurality of mode control means, wherein when a comparison is made between a case of charging each of the lithium ion secondary batteries by the first mode control means and a case of charging each of the lithium ion secondary batteries by the second mode control means, a charge current by the first mode control means is made smaller in a predetermined charge condition and equal to or smaller in other charge conditions than a charge current by the second mode control means, and the mode selecting means is configured:

to select the second mode control means when the internal resistance detecting means detects or estimates that the internal resistance is relatively high; and to select the first mode control means when the internal resistance detecting means detects or estimates that the internal resistance is relatively low.

6. The battery system according to claim 5, wherein the predetermined charge condition is a charge condition where a maximum charge current available by the second mode control means flows.

7. The battery system according to claim 5, wherein on any one of the predetermined charge condition and said other charge conditions, a charge current by the first mode control means is made smaller than a charge current by the second mode control means.

8. The battery system according to claim 1, wherein the power generating element includes a positive electrode plate and a negative electrode plate, the electrolyte includes a retained electrolyte retained between the positive electrode plate and the negative electrode plate, and the resistance correlation physical quantity detecting means is a retained electrolyte concentration detecting means for estimating the level of the internal resistance by performing at least one of detection and estimation on a level of a lithium ion concentration of the retained electrolyte having a correlation with the internal resistance.

9. The battery system according to claim 1, wherein the power generating element includes a positive electrode plate and a negative electrode plate, each of the lithium ion secondary batteries has a battery case holding the power generating element, the electrolyte includes:
 a retained electrolyte retained between the positive electrode plate and the negative electrolyte plate; and
 a stored electrolyte stored between the power generating element and the battery case so as to allow interconnection with the retained electrolyte, the resistance correlation physical quantity detecting means is a stored electrolyte concentration detecting means for estimating the level of the internal resistance by performing at least one of detection and estimation of a level of the lithium ion concentration of the stored electrolyte having a correlation with the internal resistance.

10. A battery system comprising:

one or more lithium ion secondary batteries each having a power generating element including a positive electrode plate and a negative electrode plate, an electrolyte containing lithium ions and being impregnated in the power generating element, and a battery case holding the power generating element and the electrolyte; and charge and discharge control means for controlling charging and discharging of each of the lithium ion secondary batteries, the electrolyte including: a retained electrolyte retained between the positive electrode plate and the negative electrode plate; and a stored electrolyte stored between the power generating element and the battery case so as to allow interconnection with the retained electrolyte, and stored electrolyte concentration detecting means for performing at least one of detection and estimation on a level of the lithium ion concentration in the stored electrolyte of the electrolyte in at least one of the lithium ion secondary batteries, wherein the charge and discharge control means comprises:

a plurality of mode control means for controlling charging and discharging each of the lithium ion secondary batteries on a predetermined charge and discharge condition, the mode control means including:

first mode control means for controlling charging and discharging each of the lithium ion secondary batteries on a first charge and discharge condition;

second mode control means for controlling charging and discharging each of the lithium ion secondary batteries on a second charge and discharge condition different from the first charge and discharge condition; and third mode control means for controlling charging and discharging each of the lithium ion secondary batteries on a third charge and discharge condition different from the first and second charge and discharge conditions; and mode selecting means for selecting one mode control means to be used from the plurality of mode control means, wherein when a comparison is made between a case of charging and discharging each of the lithium ion secondary batteries by the first mode control means, a case of charging and discharging each of the lithium ion secondary batteries by the second mode control means, and a case of charging and discharging each of the lithium ion secondary batteries by the third mode control means, a discharge current by the second mode control means is made smaller on a predetermined discharge condition and also equal to or smaller on other discharge conditions than a discharge current by the first mode control means, a charge current by the third mode control means is made smaller on a predetermined charge condition and also equal to or smaller on other charge conditions than a charge current by the first mode control means, the mode selecting means is configured:

to select the second mode control means when the stored electrolyte concentration detecting means detects or estimates that the lithium ion concentration of the stored electrolyte is higher than a concentration threshold value for the second mode; and to select the third mode control means when the stored electrolyte concentration detecting means detects or estimates that the lithium ion concentration of the stored electrolyte is lower than the concentration threshold value for the third mode lower than the concentration threshold value for the second mode.

11. The battery system according to claim 10, wherein
the predetermined discharge condition is a discharge condition where a maximum discharge current available by the first mode control means flows.

12. The battery system according to claim 10, wherein
the predetermined charge condition is a charge condition where a maximum charge current available by the first mode control means flows.

13. The battery system according to claim 10, wherein
on any one of the predetermined discharge condition and said other discharge conditions,
a discharge current by the second mode control means is made smaller than by the first mode control means.

14. The battery system according to claim 10, wherein
on any one of the predetermined charge condition and said other charge conditions,
a charge current by the third mode control means is made smaller than by the first mode control means.

15. The battery system according to claim 10, wherein
the stored electrolyte concentration detecting means comprises:
a first measuring electrode including: a first electrode main part immersed in the stored electrolyte; and a first conducting part exposed outside the battery case and electrically connected to the first electrode main part;
a reference electrolyte having a reference lithium ion concentration;
a reference electrolyte case part accommodating the reference electrolyte;
a second measuring electrode including: a second electrode main part immersed in the reference electrolyte; and a second conducting part exposed outside the reference electrolyte case part and electrically connected to the second electrode main part; and
a partition member having a first surface contacting the stored electrolyte and a second surface contacting the reference electrolyte for separating the stored electrolyte and the reference electrolyte from each other,
the partition member being configured to prevent ion movement between the first surface and the second surface resulting from a concentration difference between the stored electrolyte and the reference electrolyte, and to enable measurement of a potential between the reference electrolyte and the stored electrolyte by the first and second measuring electrodes.

16. A vehicle in which the battery system according to claim 1 is mounted.

17. A battery mounted device in which the battery system according to claim 1 is mounted.

18. The battery system according to claim 2, wherein
the internal resistance detecting means is resistance correlation physical quantity detecting means for estimating a level of the internal resistance based on a resistance correlation physical quantity having a correlation with the internal resistance.

19. The battery system according to claim 5, wherein
the internal resistance detecting means is resistance correlation physical quantity detecting means for estimating a level of the internal resistance based on a resistance correlation physical quantity having a correlation with the internal resistance.

20. The battery system according to claim 18, wherein
the power generating element includes a positive electrode plate and a negative electrode plate,
the electrolyte includes a retained electrolyte retained between the positive electrode plate and the negative electrode plate, and
the resistance correlation physical quantity detecting means is a retained electrolyte concentration detecting means for estimating the level of the internal resistance by performing at least one of detection and estimation on a level of a lithium ion concentration of the retained electrolyte having a correlation with the internal resistance.

21. The battery system according to claim 19, wherein
the power generating element includes a positive electrode plate and a negative electrode plate,
the electrolyte includes a retained electrolyte retained between the positive electrode plate and the negative electrode plate, and
the resistance correlation physical quantity detecting means is a retained electrolyte concentration detecting means or estimating the level of the internal resistance by performing at least one of detection and estimation on a level of a lithium ion concentration of the retained electrolyte having a correlation with the internal resistance.

* * * * *